US009017122B2

(12) United States Patent
Harada et al.

(10) Patent No.: US 9,017,122 B2
(45) Date of Patent: Apr. 28, 2015

(54) OUTBOARD MOTOR

(75) Inventors: Yoshihiro Harada, Wako (JP); Masashi Kai, Wako (JP); Kunihiko Ishizuka, Wako (JP); Naoki Aikawa, Wako (JP); Kazuhiro Ishizaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/233,988

(22) PCT Filed: Apr. 10, 2012

(86) PCT No.: PCT/JP2012/059766
§ 371 (c)(1),
(2), (4) Date: Jan. 21, 2014

(87) PCT Pub. No.: WO2013/014982
PCT Pub. Date: Jan. 31, 2013

(65) Prior Publication Data
US 2014/0141665 A1  May 22, 2014

(30) Foreign Application Priority Data

Jul. 23, 2011  (JP) .................. 2011-161457
Jul. 23, 2011  (JP) .................. 2011-161458
Jul. 23, 2011  (JP) .................. 2011-161459
Jul. 23, 2011  (JP) .................. 2011-161460

(51) Int. Cl.
*B63B 35/73*  (2006.01)
*F02B 61/04*  (2006.01)
(Continued)

(52) U.S. Cl.
CPC ..... *F02M 35/1244* (2013.01); *F02M 35/10262* (2013.01); *F02M 35/10288* (2013.01);
(Continued)

(58) Field of Classification Search
CPC .............. F02M 35/1244; F02M 35/10262; F02M 35/10288; F02M 35/1288; F02M 35/167; F02M 35/168; F02M 35/10013; F02M 35/1227; F02M 35/16; Y02T 10/146; B63H 20/24; B63H 20/245
USPC ....... 440/88 C, 88 R, 88 A, 89 R, 89 H, 89 F, 440/89 J
See application file for complete search history.

(56) References Cited

U.S. PATENT DOCUMENTS

| 6,024,616 | A | * | 2/2000 | Takayanagi | 440/77 |
| 6,099,372 | A | * | 8/2000 | Toyama | 440/77 |
| 2009/0197488 | A1 | * | 8/2009 | Sakamoto | 440/88 A |
| 2010/0255737 | A1 | * | 10/2010 | Inaba | 440/88 A |

FOREIGN PATENT DOCUMENTS

JP  H02-001460  1/1990
JP  09-280129  10/1997
(Continued)

OTHER PUBLICATIONS

Japanese Office Action with partial English translation dated Nov. 18, 2014, 4 pages.

*Primary Examiner* — Daniel V Venne
(74) *Attorney, Agent, or Firm* — Rankin, Hill & Clark LLP

(57) ABSTRACT

An outboard motor configured so that an engine is covered by an engine cover, an intake opening is provided to both sides of the engine cover, and air drawn into the engine cover from the intake opening is introduced to a throttle body. A discharging/interference-type muffler is provided partway along an intake channel for guiding air from the intake opening to the throttle body. The discharging/interference-type muffler is provided vertically in the interior of the engine cover, and the interior of the discharging/interference-type muffler is divided in two in the vertical direction.

11 Claims, 24 Drawing Sheets

(51) Int. Cl.
*F02M 35/16* (2006.01)
*F02M 35/12* (2006.01)
*F02M 35/10* (2006.01)
*B63H 20/24* (2006.01)

(52) U.S. Cl.
CPC ......... *F02M35/1288* (2013.01); *F02M 35/167* (2013.01); *F02M 35/168* (2013.01); *F02M 35/10013* (2013.01); *F02M 35/1227* (2013.01); *Y02T 10/146* (2013.01); *F02M 35/16* (2013.01); *B63H 20/24* (2013.01)

(56) References Cited

FOREIGN PATENT DOCUMENTS

| | | |
|---|---|---|
| JP | 11-079083 | 3/1999 |
| JP | 11-301591 | 11/1999 |
| JP | 2000-001198 | 1/2000 |
| JP | 2002-138912 | 5/2002 |
| JP | 2009-184373 | 8/2009 |
| JP | 2010-137715 | 6/2010 |
| JP | 2010-138854 | 6/2010 |

* cited by examiner

FIG.20
(a)
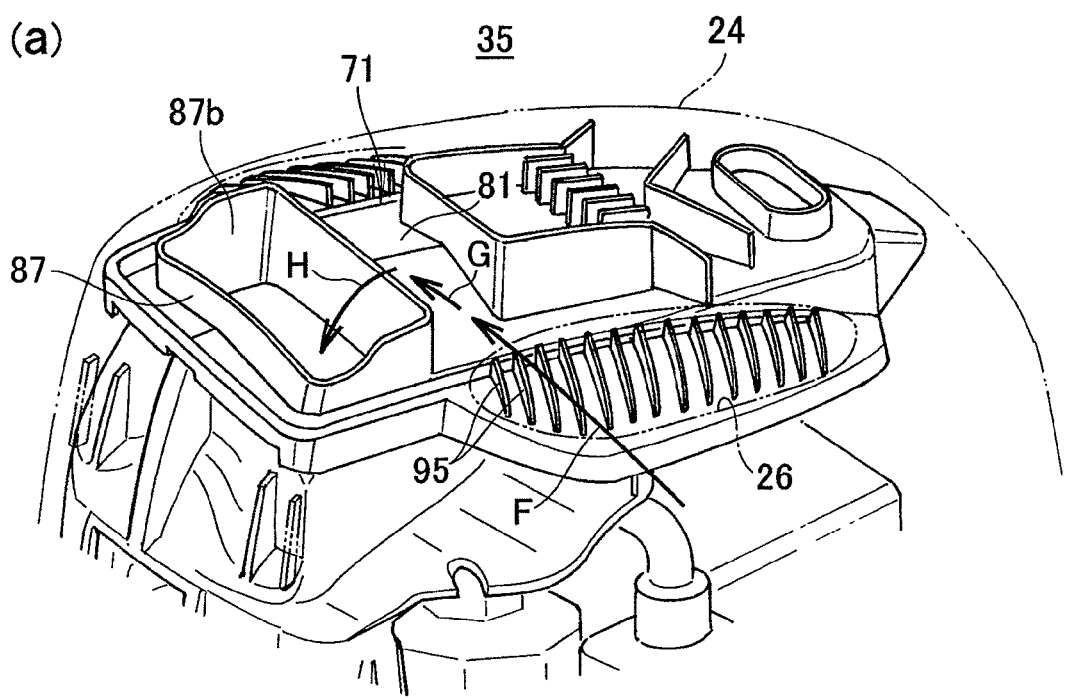
(b)
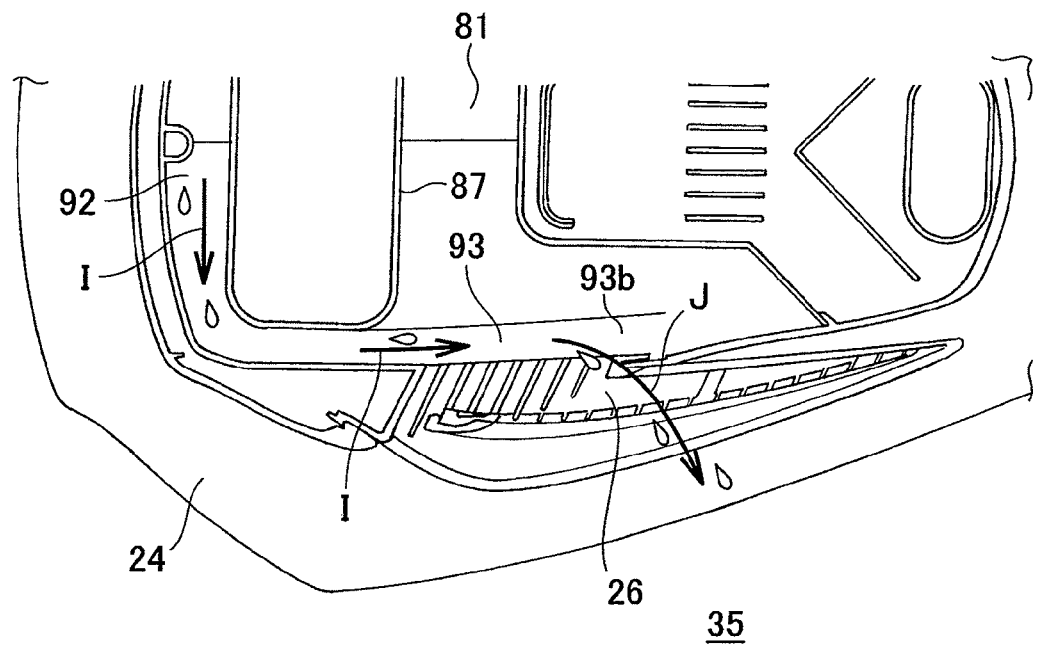

FIG.23
(a) 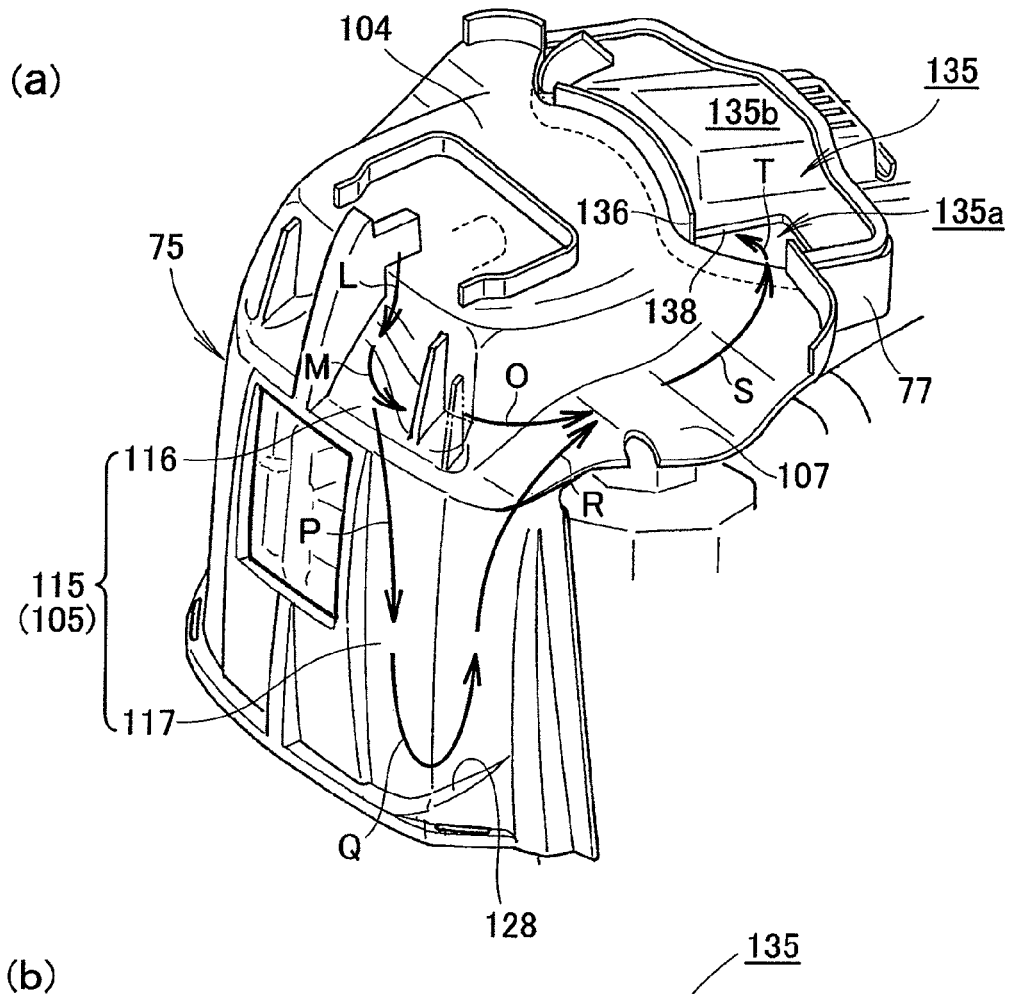
(b) 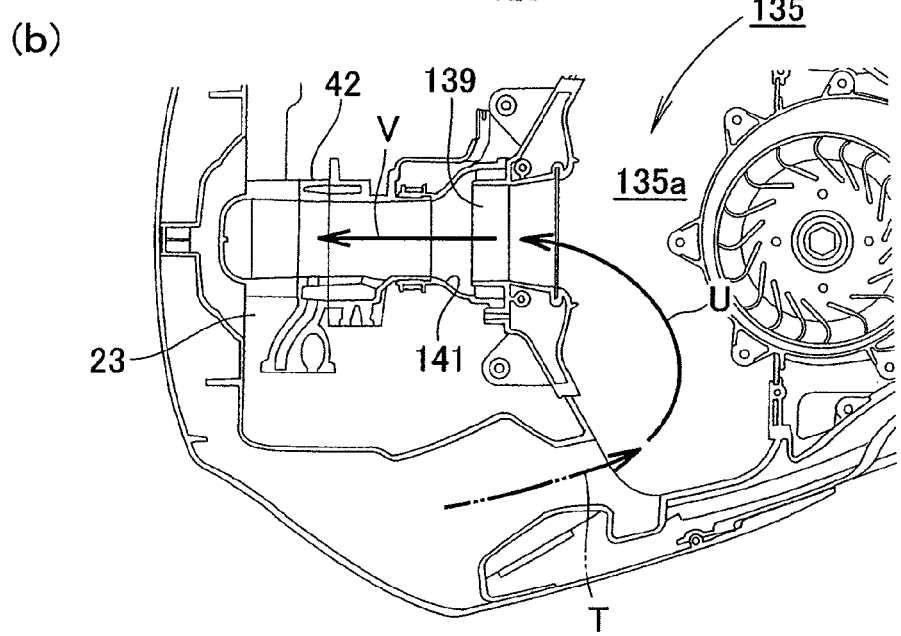

FIG.24
(a)
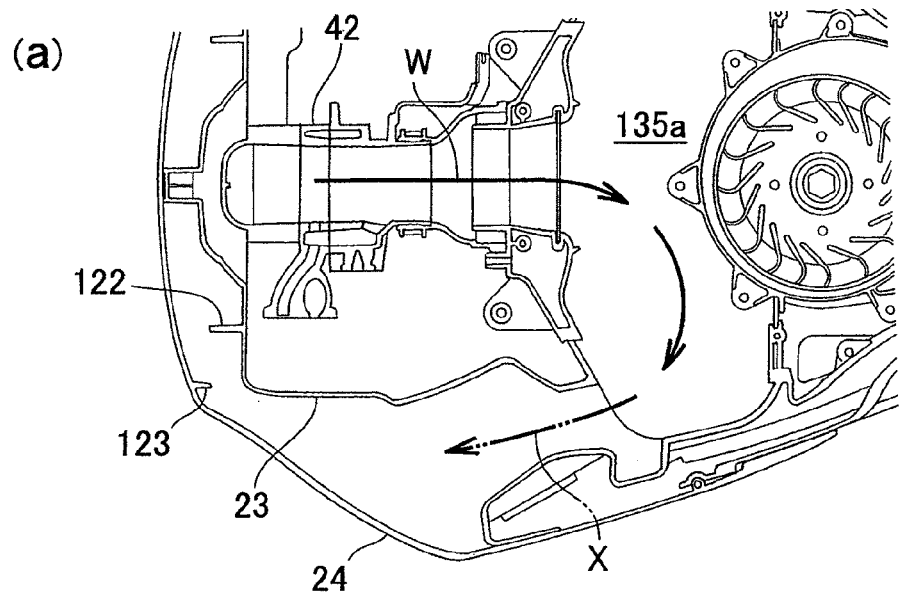
(b)
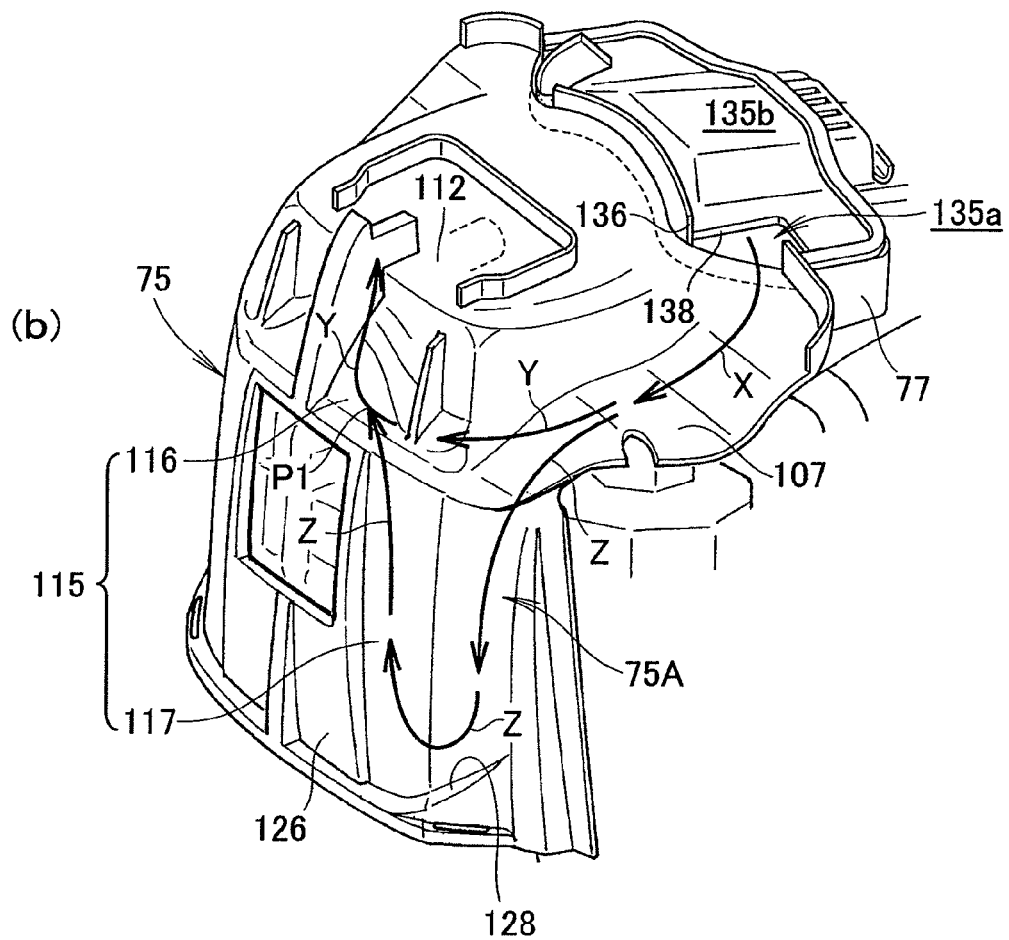

OUTBOARD MOTOR

TECHNICAL FIELD

The present invention relates to an outboard motor having an engine disposed inside an engine cover and a throttle body for introducing air drawn inside the engine cover through intake openings formed in the engine cover.

BACKGROUND ART

Outboard motors are known as disclosed in, for example, Patent Document 1 below, which includes an intake duct provided on an engine cover that covers an upper part of an engine, the intake duct having an inlet opening into an air intake chamber and an outlet opening into an air intake pipe. The air intake chamber communicates with the exterior of the engine cover through an air intake port in the engine cover. The air intake pipe communicates with a throttle body (throttle valve).

According to the outboard motor disclosed in Patent Document 1, air is drawn into the air intake chamber through the air intake port in the engine cover, whereupon the air that has been drawn into the air intake chamber can be drawn into the air intake duct through the inlet. The air that has been drawn into the air intake duct is then drawn through the outlet of the air intake duct and into the air intake pipe, and the air that has been drawn into the air intake pipe is then drawn into the throttle body.

PRIOR ART LITERATURE

Patent Document

[Patent Document 1] Japanese Patent No. 3608637

SUMMARY OF INVENTION

Technical Problem

According to the outboard motor disclosed in the disclosure of Patent Literature 1, the air intake port of the engine cover is disposed facing towards a lateral side of the outboard motor when attached to the hull. Consequently, when air intake noise is produced together with air intake pulsations and shock waves while the engine is being driven, the air intake noise produced thereby is transmitted through the air intake duct, in a lateral direction from the intake port of the engine cover. Thus, because the air intake noise is transmitted in a lateral direction, it is not readily transmitted to the hull side. However, it is difficult to achieve sufficient reduction of air intake noise through methods involving transmission of air intake noise in a lateral direction.

It is an object of the present invention to provide an outboard motor which is capable of reducing air intake noise to a sufficient extent.

Solution to Problem

According to a first aspect of the present invention, there is provided an outboard motor comprising: an engine; an engine cover covering the engine; intake openings provided in both lateral sides of the engine cover; and a throttle body for introducing air drawn inside the engine cover through the intake openings, characterized in that an interference-type muffler for reducing air intake noise is disposed partway along an intake passage configured to guide air from the intake openings to the throttle body, wherein the interference-type muffler is disposed vertically inside the engine cover, and the interference-type muffler has an interior bisected in a vertical direction.

In the invention according to a second aspect, preferably, the interference-type muffler with the interior thereof bisected in the vertical direction comprises a pair of interference-type muffler sections including a first interference-type muffler section and a second interference-type muffler section, wherein the intake passage includes a dual system having a first intake passage section for guiding the air from one of the intake openings provided in both lateral sides of the engine cover to the throttle body, and a second intake passage section for guiding the air from the other of the intake openings provided in both lateral sides of the engine cover to the throttle body, and wherein the first interference-type muffler section is disposed partway along the first intake passage section, and the second interference-type muffler section is disposed partway along the second intake passage section.

In the invention according to a third aspect, preferably, the interference-type muffler has a drain port formed in a bottom thereof for allowing water infiltrated inside the interference-type muffler to be drained out.

In the invention according to a fourth aspect, preferably, the intake passage is provided with a silencer for reducing air intake noise, the silencer being disposed downstream of the interference-type muffler and upstream of the throttle body.

In the invention according to a fifth aspect, preferably, the outboard motor of claim 1, further comprising: a tubular air intake guide section disposed partway along the intake passage and capable of guiding in a vertical direction air that has been drawn in from the intake openings; a vertical duct disposed downstream of the air intake guide section near a rear wall of the engine cover in such a manner as to be bisected in a vertical direction for guiding laterally the air that has been guided vertically by the air intake guide section; and vertical separation ribs for impeding a flow of air that has been guided laterally by the vertical duct.

In the invention according to a sixth aspect, preferably, the duct has an interior bisected in the vertical direction and comprises a pair of duct sections including a first duct section and a second duct section, the intake passage includes a dual system having a first intake passage section for guiding the air from one of the intake openings provided in both lateral sides of the engine cover to the throttle body via the first duct section, and a second intake passage section for guiding the air from the other of the intake openings provided in both lateral sides of the engine cover to the throttle body via the second duct section, and one of the separation ribs is disposed on the engine cover in a region thereof opposing the first duct section, and another of the separation ribs is disposed on the engine cover in a region thereof opposing the second duct section.

In the invention according to a seventh aspect, preferably, the duct has a drain port disposed in a bottom section thereof.

In the invention according to an eighth aspect, preferably, the duct has guide ribs disposed such that air directed into the duct is guided towards the separation ribs.

In the invention according to a ninth aspect, preferably, a silencer having a silencer chamber is disposed upstream of the throttle body in the intake passage; the silencer including: a body section forming a lower half section of the silencer chamber, the body section being disposed on a belt cover arranged covering from above a drive belt for driving auxiliary machinery of the engine; and a cover section forming an upper half section of the silencer chamber, the cover section being disposed on the engine cover and being detachably disposed on the body section.

In the invention according to a tenth aspect, preferably, the silencer includes a sealing material between the body section and the cover section.

In the invention according to an eleventh aspect, preferably, the intake passage includes: a tubular air intake guide section disposed facing a vertical direction in a region in which air drawn in through the intake openings flows in a substantially horizontal direction, the tubular air intake guide section being capable of separating water from air drawn in through the intake openings; a guide bottom section formed between the intake openings and the air intake guide section, and having a sloping shape of downward pitch towards the intake openings from the air intake guide section; and a drain groove disposed in the guide bottom section, and adapted for guiding water separated by the air intake guide section from the air intake guide section towards the intake openings; the water guided into the inlet openings by the drain groove draining out from the engine cover through the inlet openings.

In the invention according to a twelfth aspect, preferably, the drain groove is formed to have a downward pitch towards the intake openings from the intake guide section.

In the invention according to a thirteenth aspect, preferably, the drain groove has an outer groove wall disposed closer towards the intake openings, and an inner groove wall disposed further away from the intake openings, a height of the outer groove wall being greater than a height of the inner groove wall.

Advantageous Effects of Invention

In the invention according to the first aspect, intake openings are provided in both lateral sides of the engine cover, and an interference-type muffler is disposed partway along the air intake passage extending from the intake openings to the throttle body. Disposing the interference-type muffler on the air intake passage allows the frequency band of air intake noise, which is a component producing particularly high acoustic pressure in exhaust noise, to be attenuated by the interference-type muffler. In so doing, when air intake noise is produced along with air intake pulsations and shock waves while the engine is being driven, the air intake noise can be sufficiently reduced by the interference-type muffler.

In an ordinary outboard motor, dead space is present between the side walls of the engine cover and the engine. According to the present invention, the interference-type muffler is disposed in a vertical arrangement. Therefore, this dead space can be utilized to dispose the interference-type muffler therein. This obviates the need to ensure additional space for the interference-type muffler, and accordingly the outboard motor can be made smaller (more compact).

In the invention according to the second aspect, the intake passage is provided with a dual system having a first intake passage section and a second intake passage section. Furthermore, a first interference-type muffler section is disposed in the first intake passage section, and a second interference-type muffler section is disposed in the second intake passage section. Air intake noise in the first intake passage section can be reduced by the first interference-type muffler section, while air intake noise in the second intake passage section can be reduced by the second interference-type muffler section. Air intake noise produced during driving of the engine can thus be sufficiently reduced.

In the invention according to the third aspect, a drain port is disposed in the bottom section of the interference-type muffler. This interference-type muffler is disposed in a vertical arrangement. Consequently, water that has been drawn in together with air through the intake openings can be allowed to drip downward in the interference-type muffler, whereupon the water dripping down to the bottom section can drain out from the interference-type muffler through the drain port. The water that has been drawn in from the intake openings can thus be separated from the air in the interference-type muffler, so that only air is guided into the throttle body.

Specifically, the interference-type muffler is provided both with a sound deadening function for reducing air intake noise, and a water separation function for separating water from air. This obviates the need to provide individual members respectively having a sound deadening function and a water separation function, and accordingly the outboard motor can be made smaller (more compact).

In the invention according to the fourth aspect, the silencer is disposed downstream of the interference-type muffler, and upstream of the throttle body. With this arrangement, air intake noise can be reduced by the silencer, allowing air intake noise to be reduced even more.

In the invention according to the fifth aspect, air drawn in through the intake openings is guided in a vertical direction (downward) by the air intake guide section, and the air guided in the vertical direction by the air intake guide section is then guided to a lateral direction by the duct. A flow of air that has been guided laterally by the duct is impeded by the separation ribs.

Impeding the flow of air using the separation ribs causes water that has been guided together with air to collide with the separation ribs. Through collision of water against the separation ribs, the water can be made to drip downward along the separation ribs. The water that has been drawn in together with air can thus be reliably separated by the separation ribs.

In the invention according to the sixth aspect, the intake passage is provided with a dual system having a first intake passage section and a second intake passage section. Furthermore, a first duct section is disposed in the first intake passage section, and a second duct section is disposed in the second intake passage section. Furthermore, separation ribs are respectively disposed in the engine cover in a region opposing the first duct section, and in a region opposing the second duct section. Therefore, the flow of air guided through the first intake passage section is impeded by the separation ribs, and water inflowing into the first intake passage section can be separated from the air by the separation ribs. Likewise, the flow of air guided through the second intake passage section is impeded by the separation ribs, and water inflowing into the second intake passage section can be separated from the air by the separation ribs. This allows water that has been drawn in together with air to be reliably separated by the separation ribs.

In the invention according to the seventh aspect, a drain port is disposed in the bottom section of the duct. With this arrangement, water dripping downward along the separation ribs can be collected in the bottom section, and the water collecting in the bottom section can be drained to the outside through the drain port.

In the invention according to the eighth aspect, a guide rib is disposed in the duct, and air is guided towards the separation rib by this guide rib. Therefore, air directed into the duct can be guided towards the separation rib satisfactorily, and water introduced together with the air can be made to suitably collide with the separation rib. This allows the water that has been drawn in together with air to be separated by the separation rib even more reliably.

In the invention according to the ninth aspect, the body section of the silencer is disposed on the belt cover, and the cover section of the silencer is disposed on the engine cover, which allows gaps for preventing interference to be eliminated from between the engine cover and the silencer, and from between the belt cover and the silencer. Therefore, the gaps for preventing interference can instead be employed as space for increasing the capacity of the silencer. This makes it possible to increase the capacity of the silencer without increasing the size of the engine cover, and sufficiently reduce air intake noise in the intake passage.

Furthermore, the cover section of the silencer can be detached from the body section from above. Therefore, the silencer chamber can be opened up by removing the cover section from the body section. This allows grit and dirt has infiltrated into the silencer chamber to be easily eliminated without undue effort.

In the invention according to the tenth aspect, a sealing material is disposed between the base section and the cover section. With this arrangement, a reliable hermetic seal can be provided between the base section and the cover section, and air intake noise in the intake passage can be sufficiently reduced by the silencer.

In the invention according to the eleventh aspect, a tubular air intake guide section is disposed in the intake passage, making it possible for water to be separated from air by the air intake guide. Additionally provided is a guide bottom section having a downward pitch towards the intake openings from the air intake guide, a drain groove being disposed in the guide bottom section. Therefore, water that has been separated by the air intake guide can be guided along the guide bottom section and into the drain groove.

Furthermore, it is possible for water separated by the air intake guide to be guided towards the intake openings by the drain groove. Therefore, water that has been separated by the air intake guide is guided to the intake openings by the drain groove, and drained out from the engine cover through the intake openings. This allows water drawn in through the intake openings together with air to be reliably separated from the air.

In the invention according to the twelfth aspect, the drain groove is formed to have a downward pitch towards the intake openings from the intake guide section. Therefore, water separated by the air intake guide is guided towards the intake openings satisfactorily by the drain groove. This allows the water separated by the air intake guide to be reliably drained out from the engine cover through the intake openings.

In the invention according to the thirteenth aspect, the height of the outer groove wall of the drain groove is greater than the height of the inner groove wall. Therefore, water inside the drain groove can be largely isolated from air flowing above the drain groove, whereby the water inside the drain groove can be prevented from splashing out therefrom due to the air flowing thereabove. This allows water inside the drain groove to be guided satisfactorily towards the intake openings, and reliably drained out from the engine cover through the intake openings.

BRIEF DESCRIPTION OF DRAWINGS

FIG. 11 (b) is an enlarged view of area 11b in FIG. 11 (a);

FIG. 20(a) and FIG. 20(b) are views illustrative of the manner in which water is drained out from the engine cover via a drain groove of the air intake means shown in FIG. 8;

FIG. 23(a) and FIG. 23(b) are views illustrative of the manner in which air is directed into a throttle body; and FIG. 24(a) and FIG. 24(b) are views illustrative of the manner in which air intake noise is reduced by the silencer and the discharging/interference-type muffler means (one of the interference-type muffler sections).

DESCRIPTION OF EMBODIMENT

A certain preferred embodiment of the present invention will be described in detail below with reference to the attached drawings.

Embodiment

Figure 1:
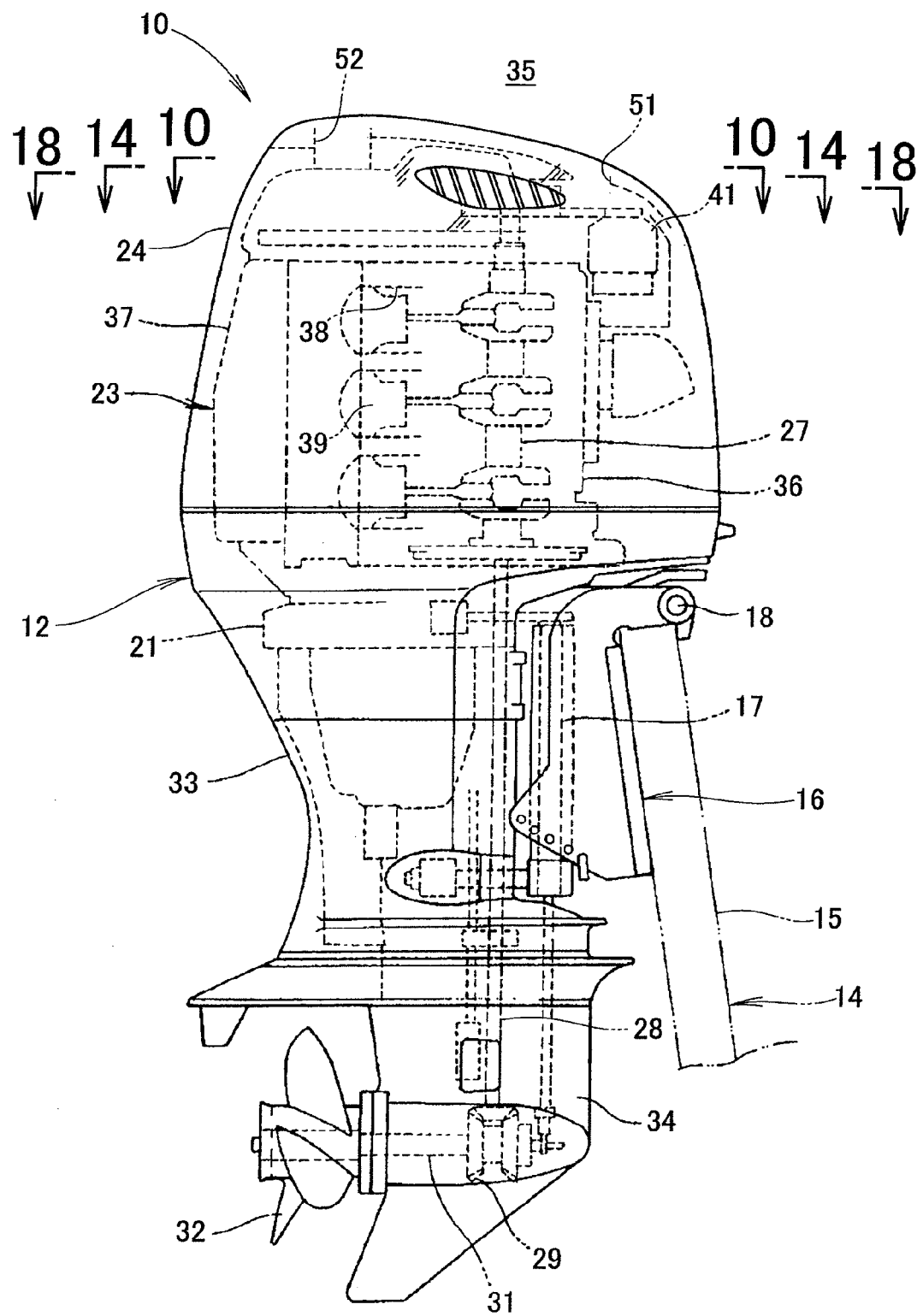
FIG. 1 is a side view of an outboard motor according to an embodiment of the present invention.

As shown in FIG. 1, an outboard motor 10 includes an outboard motor body 12, and attachment means 16 disposed on the outboard motor body 12 and capable of being detachably attached to a hull 14 (in more specific terms, to a stern 15) of a boat. The attachment means 16 includes a swivel shaft 17 about which the outboard motor body 12 can swing laterally (horizontally), and a tilt shaft 18 about which the outboard motor body 12 can swing vertically.

The outboard motor body 12 includes a mount case 21 disposed on the attachment means 16, an engine 23 installed in the upper part of the mount case 21, an engine cover 24 covering the engine 23, a drive shaft 28 coaxially connected to a crankshaft 27 of the engine 23, a gear mechanism 29 to which rotation of the engine 23 (crankshaft 27) is transmitted via the drive shaft 28, and a propeller 32 to which rotation of the gear mechanism 29 is transmitted via a propeller shaft 31.

The outboard motor body 12 is further provided with exhaust means (venting means) 51 for discharging air inside the engine cover 24 to the outside 35, and air intake means 52 for guiding air into the engine 23 from the outside 35 of the engine cover 24.

The drive shaft 28 is covered by an extension case 33 disposed below the mount case 21. The gear mechanism 29 and the propeller shaft 31 are covered by a gear case 34 disposed below the extension case 33.

The engine 23 includes a cylinder block 36 constituting an engine body, a head cover 37, the crankshaft 27, cylinders 38, pistons 39, and the like, and is further provided with auxiliary machinery 41 of the engine 23.

By driving the engine 23 in this outboard motor 10, the rotation of the engine 23 is transmitted to the propeller 32 through the drive shaft 28, the gear mechanism 29, and the propeller shaft 31, rotating the propeller 32 to propel the hull 14.

Figure 2:
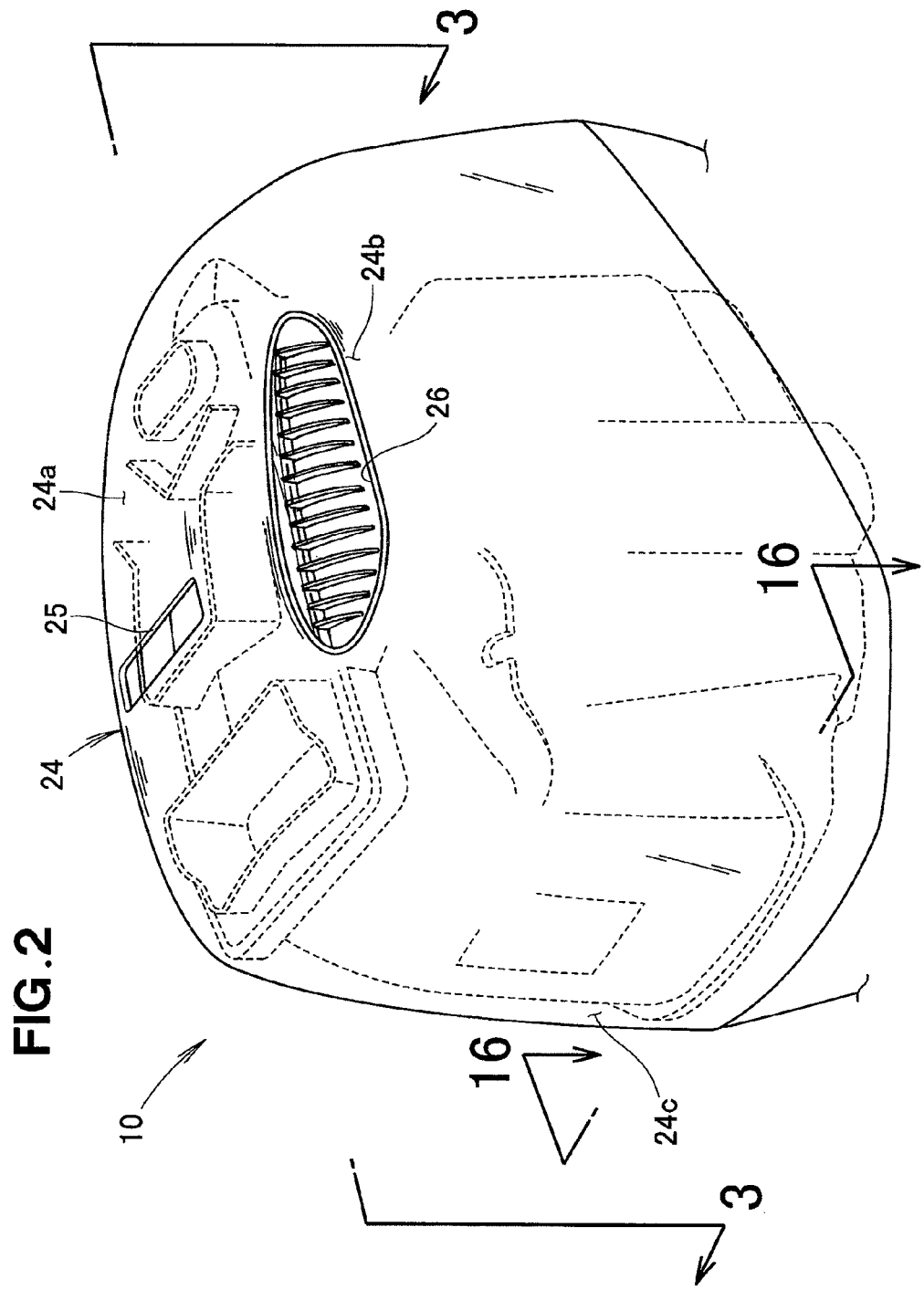
FIG. 2 is a perspective view of an engine cover shown in FIG. 1.
Figure 10:
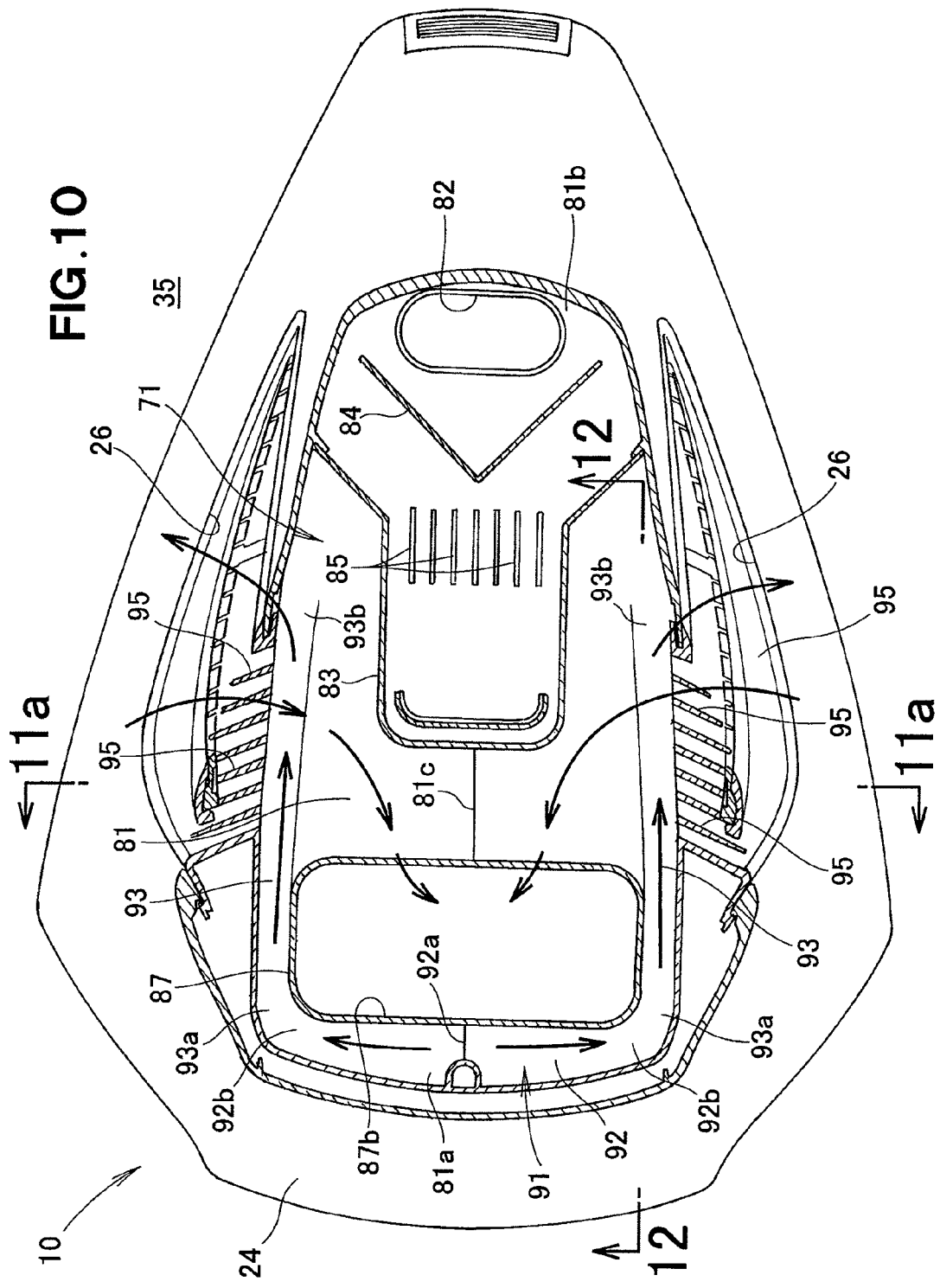
FIG. 10 is a cross sectional view taken along line 10-10 in FIG. 1.

As shown in FIG. 2, the engine cover 24 has an exhaust opening 25 formed in an upper section 24a, and intake openings 26 formed in both lateral sides 24b. Only one intake opening 26 is shown in FIG. 2, and the other intake opening 26 (on the far side) is shown in FIG. 10. The exhaust opening 25 and the intake openings 26 shall be described in detail below.

Figure 3:
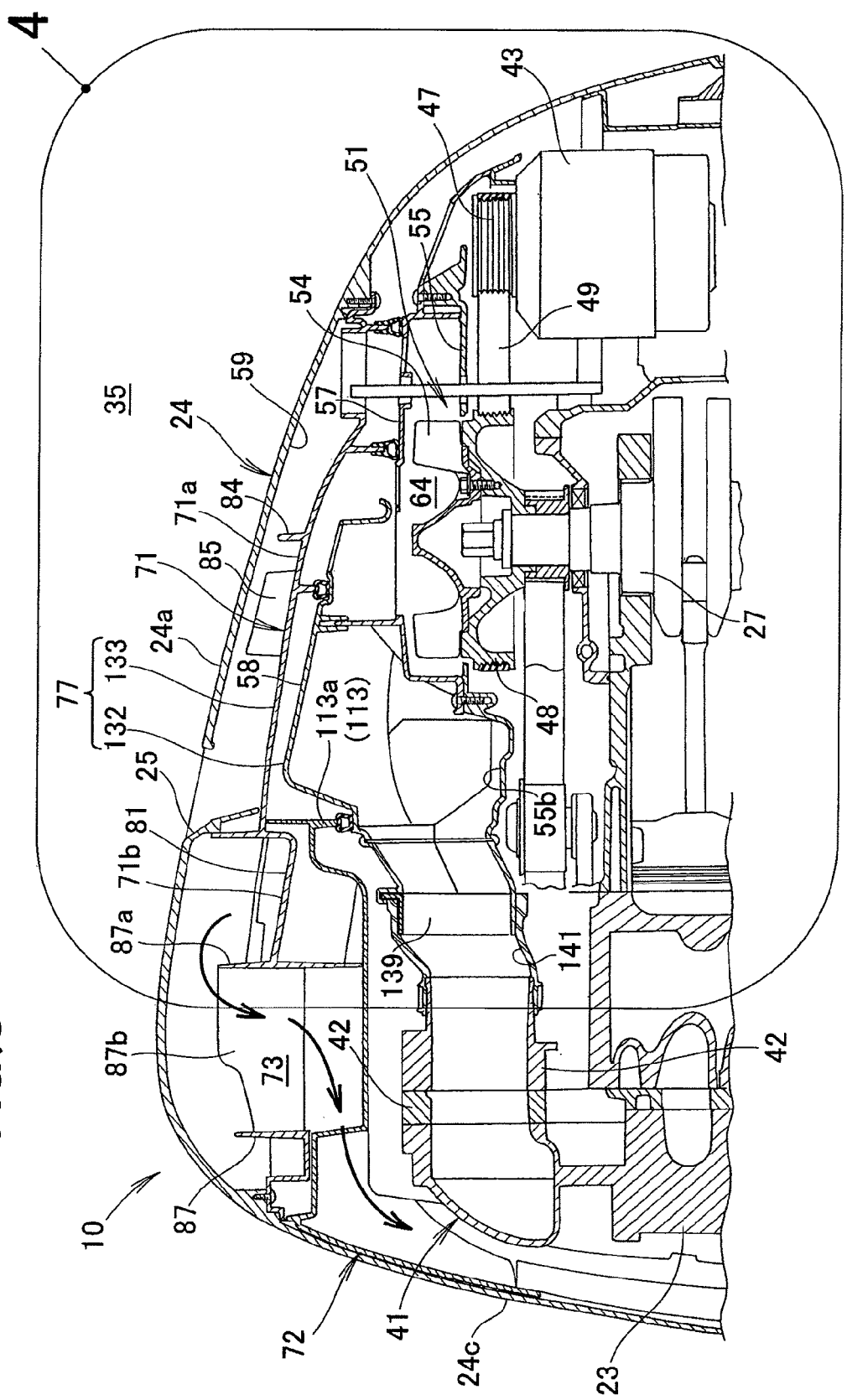
FIG. 3 is a cross sectional view taken along line 3-3 in FIG. 2.

As shown in FIG. 3, the auxiliary machinery 41 of the engine 23 includes a throttle body 42 communicating with combustion chambers of the engine 23; a generator 43 disposed to the opposite side of the throttle body 42; and an exhaust fan 54 disposed between the generator 43 and the throttle body 42.

Figure 4:
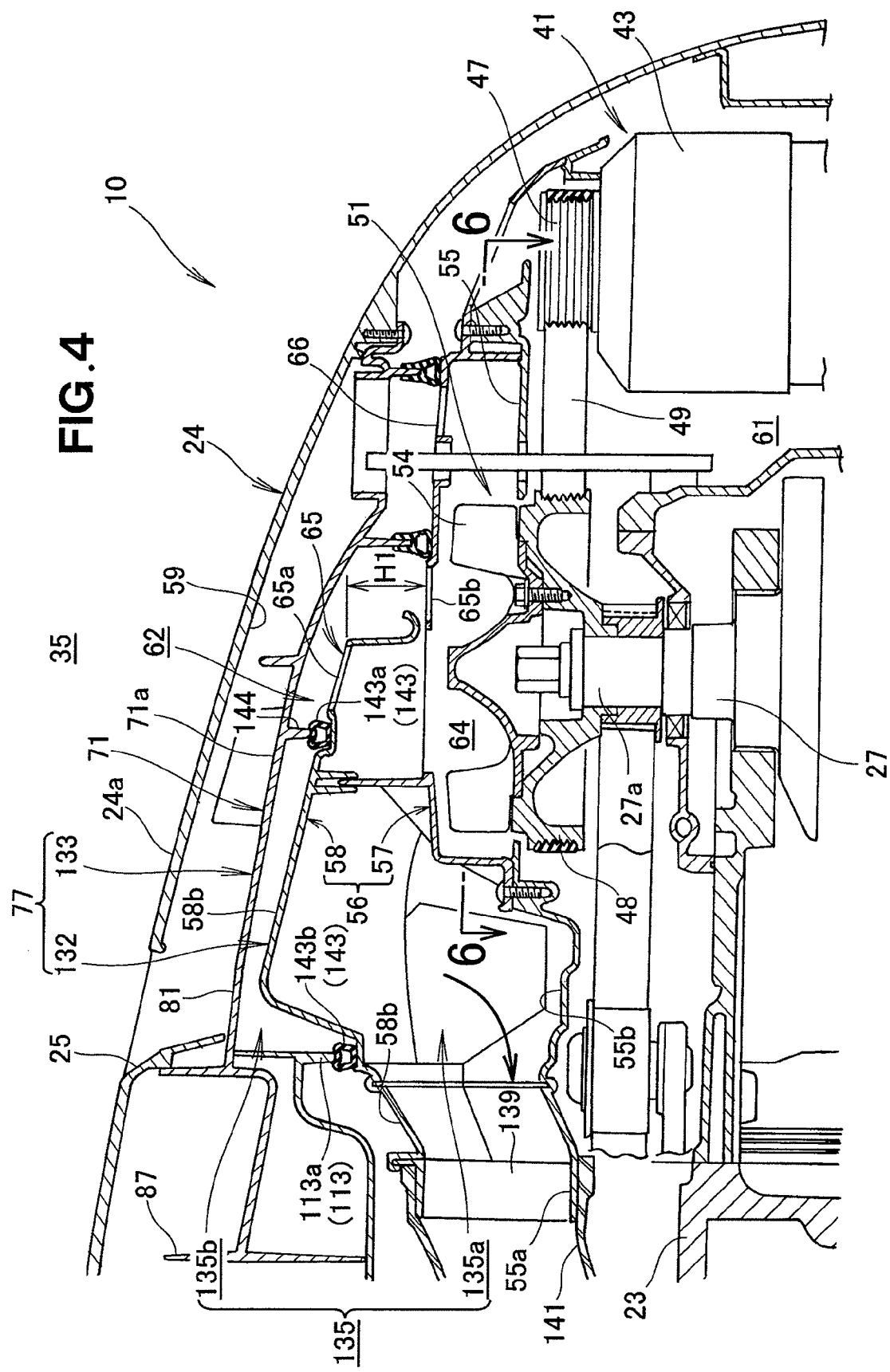
FIG. 4 is an enlarged view of area 4 in FIG. 3.

As shown in FIG. 4, a drive belt 49 is looped around a driving pulley 48 and a driven pulley 47 of the generator 43. The driving pulley 48 is disposed at an upper end section 27a of the crankshaft 27. Consequently, the driving pulley 48 rotates through rotation of the crankshaft 27. Rotation of the driving pulley 48 is transferred to the driven pulley 47 via the drive belt 49. The generator 43 is driven through rotation of the driven pulley 47.

Figure 5:
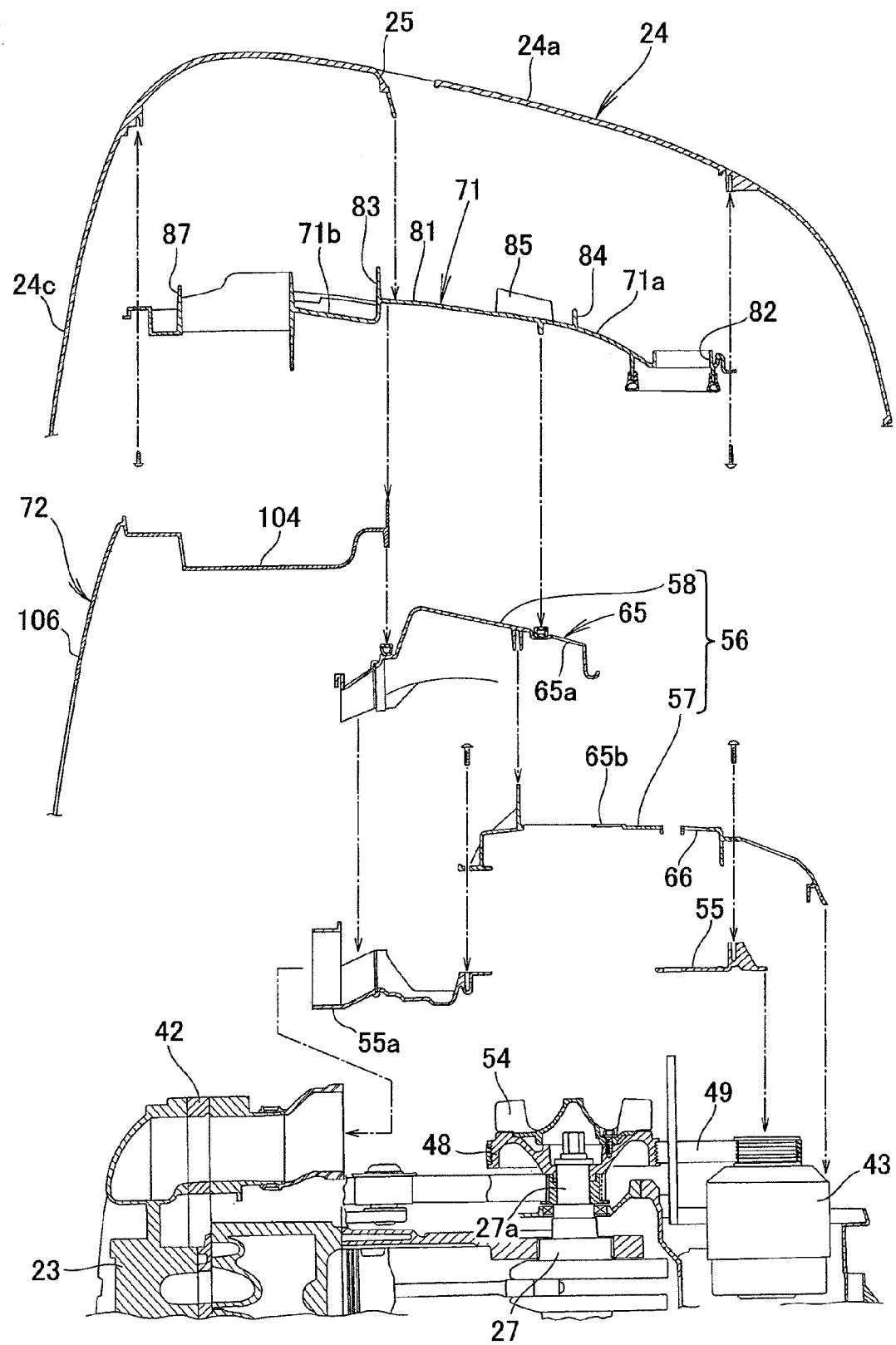
FIG. 5 is an exploded cross sectional view of the outboard motor shown in FIG. 3.

As shown in FIGS. 4 and 5, the exhaust means 51 includes the exhaust fan 54 coaxially disposed on the upper section of the driving pulley 48; a belt cover 55 covering a top of the drive belt 49; a fan cover 56 disposed above the belt cover 55; and an exhaust passage 59 for guiding air inside the engine cover 24 to the outside.

The exhaust fan 54 is coaxially disposed on an upper section of the driving pulley 48. Consequently, the exhaust fan 54 is caused to rotate through rotation of the driving pulley 48. The exhaust fan 54 discharges air inside the engine cover 24 to the outside 35 of the engine cover 24.

The belt cover 55 is disposed covering the top of the drive belt 49, as well as covering a top of part of the generator 43. Moreover, a rear end section 55a of the belt cover 55 is disposed to the throttle body 42 side (FIG. 3). By disposing the belt cover 55 inside the engine cover 24, the inside of the engine cover 24 is partitioned into an engine compartment 61 and an intake/exhaust chamber 62.

The engine compartment 61 is formed below the belt cover 55, and houses the engine 23. The intake/exhaust chamber 62 includes the exhaust passage 59 and an intake channel or passage 73 that are formed above the belt cover 55 (FIG. 3). The engine compartment 61 and the intake/exhaust chamber 62 communicate with one another.

The fan cover 56 is disposed on an upper side of the belt cover 55. The fan cover 56 includes a first fan cover 57 disposed on the upper side of the belt cover 55, and a second fan cover 58 disposed on the upper side of the first fan cover 57. Disposing the first fan cover 57 on the upper side of the belt cover 55, and the second fan cover 58 on the upper side of a front section of the first fan cover 57 causes an exhaust fan chamber 64 to be formed by the belt cover 55 and the first and second fan covers 57, 58.

Being disposed above the engine 23, the belt cover 55 and the fan cover 56 may be disposed independently from the engine 23. Consequently, it is possible to decide upon any desired shape for the belt cover 55 and the fan cover 56 irrespective of the contours of the engine 23. In so doing, it is possible to select any desired shape for the belt cover 55 and the fan cover 56, and therefore gaps and irregularities can be eliminated from the exhaust fan chamber 64.

So eliminating gaps and irregularities from the exhaust fan chamber 64 allows the exhaust fan chamber 64 to be tailored to a shape allowing the performance of the exhaust fan 54 to be fully realized. Consequently, air in the intake/exhaust chamber 62 can be efficiently drawn into the exhaust fan chamber 64, and the air drawn into the exhaust fan chamber 64 can be efficiently discharged to the outside of the exhaust fan chamber 64. Furthermore, the air discharged to the outside of the exhaust fan chamber 64 can be efficiently discharged to the outside 35 of the engine cover 24.

Furthermore, the exhaust fan chamber 64 is disposed above the belt cover 55, while the drive belt 49 and the driving pulley 48 are disposed below the belt cover 55. Consequently, the exhaust fan chamber 64 can be partitioned off from the drive belt 49 and the driving pulley 48 by the belt cover 55.

Partitioning off the exhaust fan chamber 64 from the drive belt 49 and the driving pulley 48 prevents the flow of air drawn into the exhaust fan chamber 64 from being disturbed by the rotation of the drive belt 49 or of the driving pulley 48. This allows the air in the intake/exhaust chamber 62 to be discharged to the outside of the engine cover 24 even more efficiently.

Figure 6:
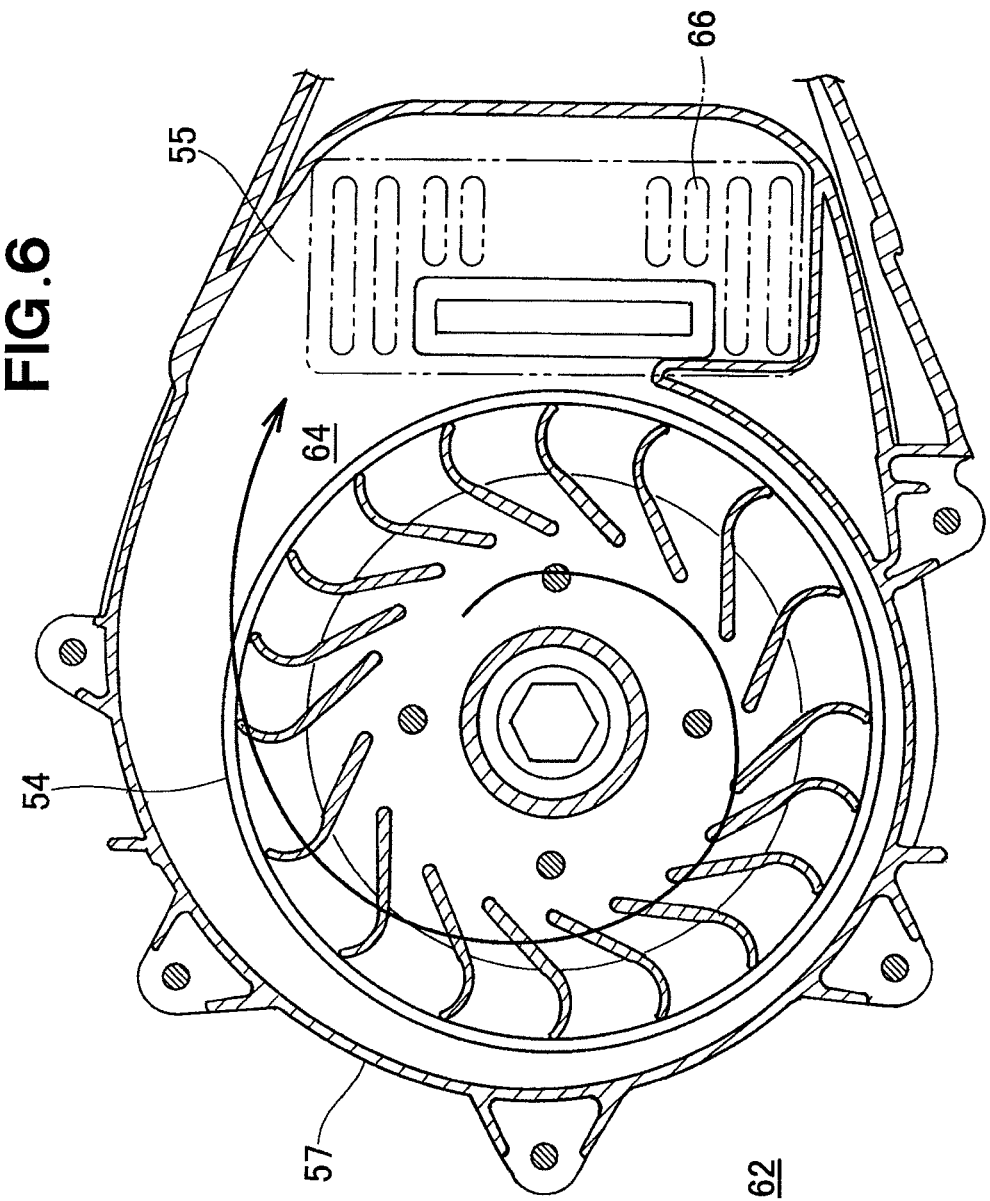
FIG. 6 is a cross sectional view taken along line 6-6 in FIG. 4.

The second fan cover 58 is disposed higher than the first fan cover 57 by H1. Consequently, a step H1 is provided in the fan cover 56 by the first fan cover 57 and the second fan cover 58. The exhaust fan chamber 64 is partitioned off from the engine compartment 61 and the intake/exhaust chamber 62. As shown in FIG. 6, the exhaust fan 54 is rotatably housed in the exhaust fan chamber 64. The rotation of the exhaust fan 54 in the exhaust fan chamber 64 causes air in the exhaust fan chamber 64 to be directed into an exhaust port 66 as shown by the arrow.

Figure 7:
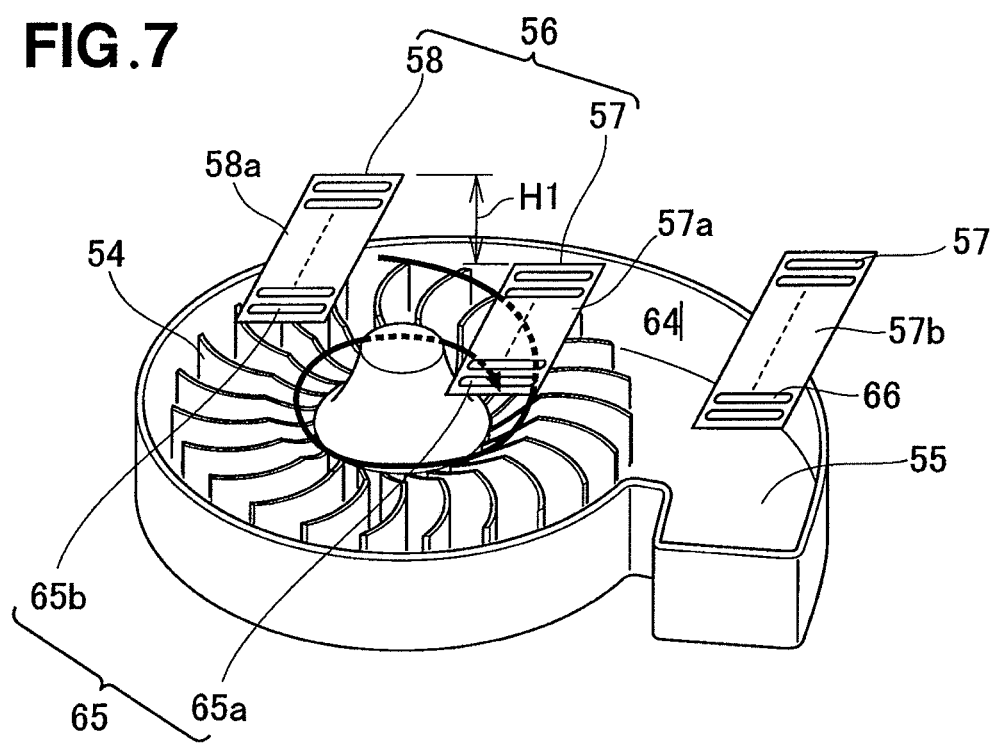
FIG. 7 is a perspective view of an exhaust fan chamber and an exhaust fan shown in FIG. 4.

As shown in FIGS. 4 and 7, an air intake port 65 through which the intake/exhaust chamber 62 communicates with the exhaust fan chamber 64 is formed in the first and second fan covers 57, 58. The air intake port 65 has a first air intake port 65a formed at the approximate center 57a of the first fan cover 57, and a second air intake port 65b formed in a front section 58a of the second fan cover 58. The first and second air intake ports 65a, 65b are disposed above the exhaust fan 54.

The step H1 is thus provided between the first fan cover 57 and the second fan cover 58, and the first and second air intake ports 65a, 65b are disposed in the first and second fan covers 57, 58. Consequently, the exhaust fan chamber 64 is formed into a scroll shape (volute shape) as shown by the arrow. By adopting a scroll shape for the exhaust fan chamber 64, air can be drawn smoothly into the exhaust fan chamber 64 through the first and second air intake ports 65a, 65b.

The exhaust port 66, through which the exhaust fan chamber 64 communicates with the exhaust passage 59, is formed in a front section 57b of the first fan cover 57. The exhaust passage 59 is formed along an upper section 24a of the engine cover 24 by the upper section 24a of the engine cover 24 and a front half section 71a of an air guide 71.

The exhaust passage 59 communicates with the outside 35 of the engine cover 24 through the exhaust opening 25. As mentioned above, the exhaust opening 25 is formed in the upper section 24a of the engine cover 24. Specifically, the exhaust fan chamber 64 communicates with the outside 35 of the engine cover 24 through the exhaust port 66, the exhaust passage 59, and the exhaust opening 25.

Due to rotation of the exhaust fan 54, the air in the intake/exhaust chamber 62 is drawn through the air intake port 65 and into the exhaust fan chamber 64. The air having been drawn into the exhaust fan chamber 64 is then directed through the exhaust port 66 and to the outside of the exhaust fan chamber 64 (specifically, into the exhaust passage 59). The air having been directed into the exhaust passage 59 is then discharged to the outside 35 of the engine cover 24 from the exhaust opening 25, through the exhaust passage 59.

As mentioned above, the intake/exhaust chamber 62 communicates with the engine compartment 61. Consequently, the air in the intake/exhaust chamber 62, as well as the air in the engine compartment 61, is reliably discharged to the outside 35 of the engine cover 24 through rotation of the exhaust fan 54.

Furthermore, the exhaust fan chamber 64 has been formed to a scroll shape by providing the step H1 in the fan cover 56. By adopting a scroll shape for the exhaust fan chamber 64, the air in the intake/exhaust chamber 62 can be more smoothly drawn into the exhaust fan chamber 64 through the first and second air intake ports 65a, 65b.

Consequently, the air in the intake/exhaust chamber 62 can be more smoothly discharged to the outside 35 of the engine cover 24. This allows the air in the intake/exhaust chamber 62, as well as in the engine compartment 61, to be efficiently discharged to the outside 35 of the engine cover 24 through the intake/exhaust chamber 62. Consequently, the air (air temperature) inside the intake/exhaust chamber 62 and in the engine compartment 61 can be kept at appropriate temperature.

In the outboard motor, typically, the auxiliary machinery 41, such as the throttle body 42, the generator 43, and so on, is disposed on the upper side of the engine body. Air superheated by the engine 23 collects in the upper section of the engine cover 24. Consequently, by providing the upper section of the engine cover 24 with the air intake port 65 and the exhaust port 66, air (superheated air) that has collected in the space in the upper section of the engine cover 24 (specifically, in the intake/exhaust chamber 62) can be quickly discharged (eliminated) during a hot restart.

This allows the cooling efficiency of the auxiliary machinery 41 disposed above the engine 23 and below the belt cover 55 to be increased. Herein, a hot restart refers to a restart of the engine 23 after the engine 23 has been stopped, but before the engine 23 has cooled down.

Additionally, by providing the exhaust port 66 above the exhaust fan 54, air can be discharged upwardly through the exhaust port 66. Furthermore, by providing the exhaust passage 59 in the upper section 24a of the engine cover 24, the exhaust passage 59 can be disposed above the exhaust port 66.

Consequently, air discharged upwardly through the exhaust port 66 can be directed smoothly into the exhaust passage 59. This allows air to be discharged more smoothly to the outside 35 of the engine cover 24 through the exhaust opening 25 in the upper section 24a of the engine cover 24.

Figure 8:
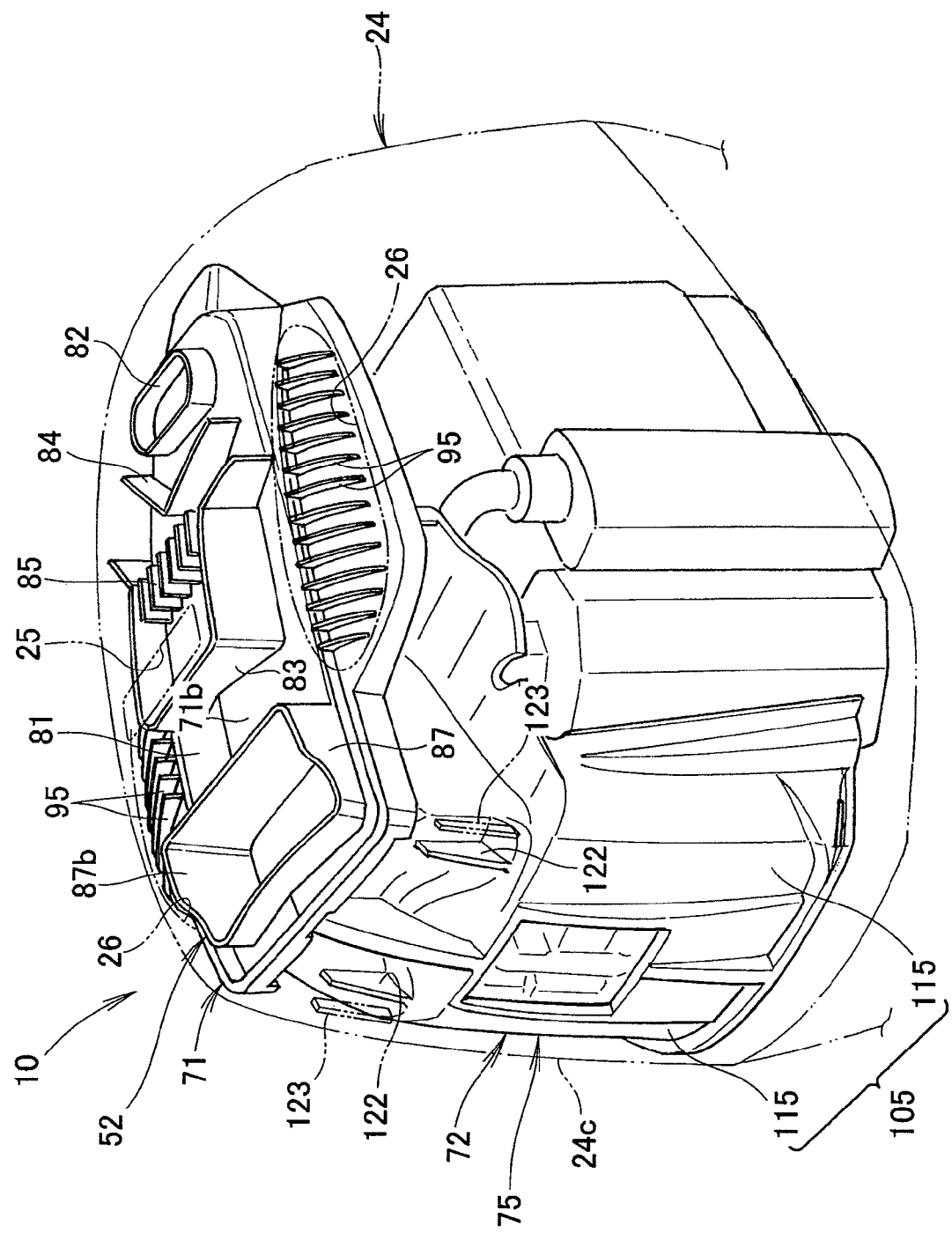
FIG. 8 is a perspective view of an air intake means (an air guide and a rear duct) shown in FIG. 3.
Figure 9:
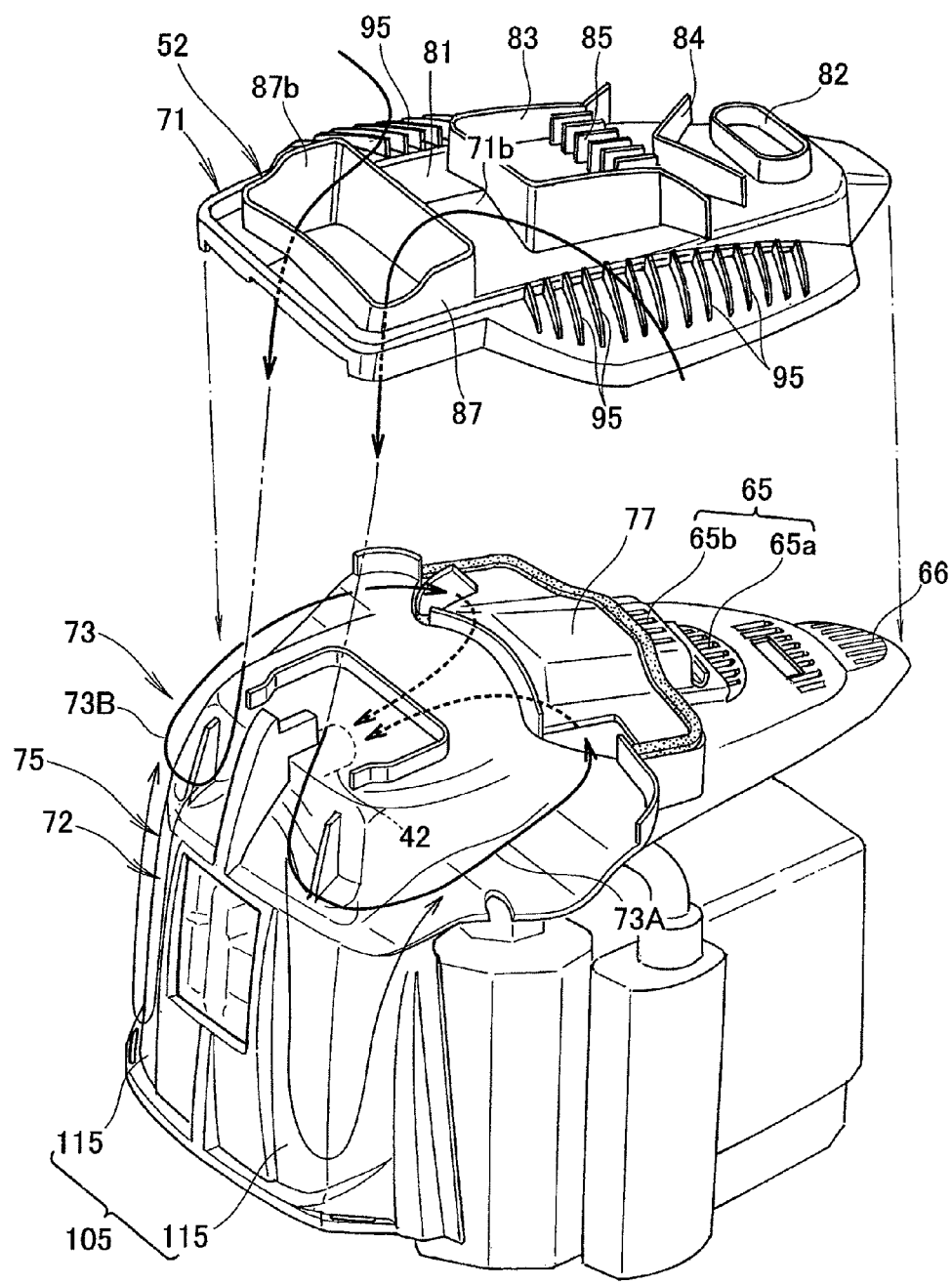
FIG. 9 is an exploded perspective view of the air intake means shown in FIG. 8.

As shown in FIGS. 8 and 9, the air intake means 52 includes the intake passage 73 for guiding air into the throttle body 42 from the outside of the engine cover 24, a discharging/interference-type muffler means (interference-type muffler) 75 disposed partway along the intake passage 73, and a silencer 77 disposed downstream of the discharging/interference-type muffler means 75 and upstream of the throttle body 42.

The intake passage 73 is a passage through which air drawn inside the engine cover 24 through the intake openings 26 at both lateral sides of the engine cover 24 can be introduced into the throttle body 42. The intake passage 73 is formed, inter alia, by the engine cover 24, the air guide 71, and a rear duct 72. This intake passage 73 includes dual system passage sections having a pair of intake passage sections 73A, 73B (a first intake passage section 73A and a second intake passage section 73B). The first and second intake passage sections 73A, 73B are shown by arrows in FIG. 9.

The first intake passage section 73A guides air into the throttle body 42 through one intake opening 26 of the intake openings 26 provided at both lateral sides of the engine cover 24. The first intake passage section 73A is provided with a first interference-type muffler section 75A (see FIG. 16) disposed partway along the first intake passage section 73A, and with the silencer 77 which is disposed downstream of the first interference-type muffler section 75A and upstream of the throttle body 42.

The second intake passage section 73B guides air into the throttle body 42 through the other intake opening 26 of the intake openings 26 provided at both lateral sides of the engine cover 24. The second intake passage section 73B is provided with a second interference-type muffler section 75B (see FIG. 16) disposed partway along the second intake passage section 73B, and with the silencer 77 which is disposed downstream of the second interference-type muffler section 75B and upstream of the throttle body 42. The silencer 77 is employed (used concomitantly) by both the first intake passage section 73A and the second intake passage section 73B.

Consequently, air intake noise in the first intake passage section 73A can be reduced by the first interference-type muffler section 75A (see FIG. 16) and the silencer 77. Furthermore, air intake noise in the second intake passage section 73B can be reduced by the second interference-type muffler section 75B (see FIG. 16) and the silencer 77. This allows air intake noise produced during driving of the engine 23 to be sufficiently reduced. The discharging/interference-type muffler means 75 (the first interference-type muffler section 75A and the second interference-type muffler section 75B) and the silencer 77 shall be described in detail below.

As shown in FIGS. 3 and 5, the air guide 71 is arranged to the upper side of the fan cover 56 and the rear duct 72, and disposed at the back surface side of the upper section 24a of the engine cover 24. The air guide 71 includes a guide bottom section 81 covering the fan cover 56 and the rear duct 71, a passage inlet portion 82 disposed in a front end section of the guide bottom section 81, a side wall 83 (see also FIG. 9) for the exhaust passage 59, disposed to the rear of the passage inlet port 82; and first and second guide panels 84, 85 disposed inside the exhaust passage 59. The passage inlet port 82 is a region that forms the inlet port of the exhaust passage 59.

The exhaust passage 59 between the engine cover 24 and the front half section 71a of the air guide 71 is formed by covering a space between the guide bottom section 81 and the upper section 24a of the engine cover 24, with the side wall 83 of the exhaust passage 59. By providing the first and second guide panels 84, 85 in the exhaust passage 59, air directed into the exhaust passage 59 from the exhaust fan chamber 64 can be guided smoothly towards the exhaust opening 25 by the guide panels 84, 85.

As shown in FIG. 10, the air guide 71 is further provided with an air intake guide section 87 disposed in a rear end section of the guide bottom section 81, a drain groove 91 disposed to extend frontward from the outside perimeter of the air intake guide section 87, and a plurality of guide plates 95 disposed to the outside of the drain groove 91. The plurality of guide plates 95 is disposed in regions corresponding to the intake openings 26 at both sides, and is designed to separate water from the air drawn in through the intake openings 26.

It may occur that, as air is drawn inside the engine cover 24 through the intake openings 26, spray, or drops of water that have collected around the intake openings 26, could get drawn inside the engine cover 24 together with the air. Therefore, the water drawn in together with air through the intake openings 26 can be separated from the air by colliding against the plurality of guide plates 95.

Here, the openings of the intake openings 26 have been determined in such a way that the air intake resistance is not increased by the plurality of guide plates 95. The air directed inside the engine cover 24 through the intake openings 26 is directed approximately horizontally along the guide bottom section 81, to the air intake guide section 87.

As shown in FIGS. 3 and 10, the air intake guide section 87 is formed partway along the intake passage 73. This air intake guide section 87 is a tubular passage disposed facing in a vertical direction in a rear end section of the guide bottom section 81, and having an air intake port 87b disposed at an upper end section 87a thereof. The rear end section of the guide bottom section 81 is a region through which air drawn in through the intake openings 26 flows in an approximately horizontal direction as shown by the arrows (see FIG. 10).

The air intake port 87b of the air intake guide section 87 is arranged above the guide bottom section 81. The space above the guide bottom section 81 communicates with the space below the guide bottom section 81 through this air intake guide section 87. Consequently, air drawn in through the intake openings 26 is drawn inside the air intake guide section 87 through the air intake port 87b of the air intake guide section 87, whereby the air can be guided downwardly (in a vertical direction) as shown by the arrows (see FIG. 3).

Furthermore, by disposing the air intake guide section 87 to face in a vertical direction in the rear end section of the guide bottom section 81, the direction of flow of air drawn in through the intake openings 26 is redirected by the air intake guide section 87. At this time, water contained in the air collides against the air intake guide section 87, so that the water can be separated from the air. Here, the shape of the air intake guide section 87 has been determined in such a way that the air intake resistance is not increased by the air intake guide section 87.

Specifically, the air intake guide section 87 is designed with the capability to separate water from air drawn inside the engine cover 24 through the intake openings 26. The water separated by the air intake guide section 87 is directed into a rear drain groove section 92 (discussed below) and the guide bottom section 81.

The guide bottom section 81 is formed to have a downward pitch of a slope angle $\theta 1$ (see FIG. 12) going towards the front edge 81b from a rear edge 81a thereof (FIG. 10). Furthermore, the guide bottom section 81 is formed to have a downward pitch of a slope angle $\theta 2$ (see FIG. 11) towards both lateral sides from a widthwise center 81c thereof. Specifically, between the intake openings 26 and the air intake guide section 87, the guide bottom section 81 is formed to a sloped profile of downward pitch towards the intake openings 26 from the air intake guide section 87.

The drain groove 91 is disposed in the guide bottom section 81. The drain groove 91 has the rear drain groove section 92, which is disposed in a rear section of the air intake guide section 87, and side drain groove sections 93 at both sides, extending frontward through both sides of the air intake guide section 87. This drain groove 91 is designed such that it is possible for water separated from air in the air intake guide section 87 to drain to the outside 35 of the engine cover 24 through the intake openings 26.

The rear drain groove section 92 is disposed in a rear section of the air intake guide section 87, and like the guide bottom section 81, is formed to have a downward pitch of a slope angle $\theta 2$ (see FIG. 11) towards both lateral sides from a widthwise center 92a thereof. Consequently, water separated from air in the air intake guide section 87 can be guided into both outside edge sections 92b of the rear drain groove section 92, as shown by the arrows.

The side drain groove sections 93 situated at both sides extend frontward to the approximate center of the intake openings 26 in the longitudinal direction, from both outside edge sections 92b of the rear drain groove section 92. Specifically, in the side drain groove sections 93, rear edge sections 93a communicate with the outside edge sections 92b of the rear drain groove section 92, while front end sections 93b are positioned in the approximate center of the intake openings 26 in the longitudinal direction. Consequently, water that has been directed into the rear drain groove section 92 after being separated in the air intake guide section 87 is guided into the side drain groove sections 93 from the rear edge sections 93a of the side drain groove sections 93.

The side drain groove sections 93 are disposed to the outside of the widthwise center 81c. Furthermore, the guide bottom section 81 is formed to have a downward pitch of a slope angle $\theta 2$ (see FIG. 11) towards both sides from the widthwise center 81c. Consequently, water that has been separated in the air intake guide section 87 and directed into the guide bottom section 81 is guided into the side drain groove sections 93 from the rear edge sections 93a of the side drain groove sections 93.

Figure 12:
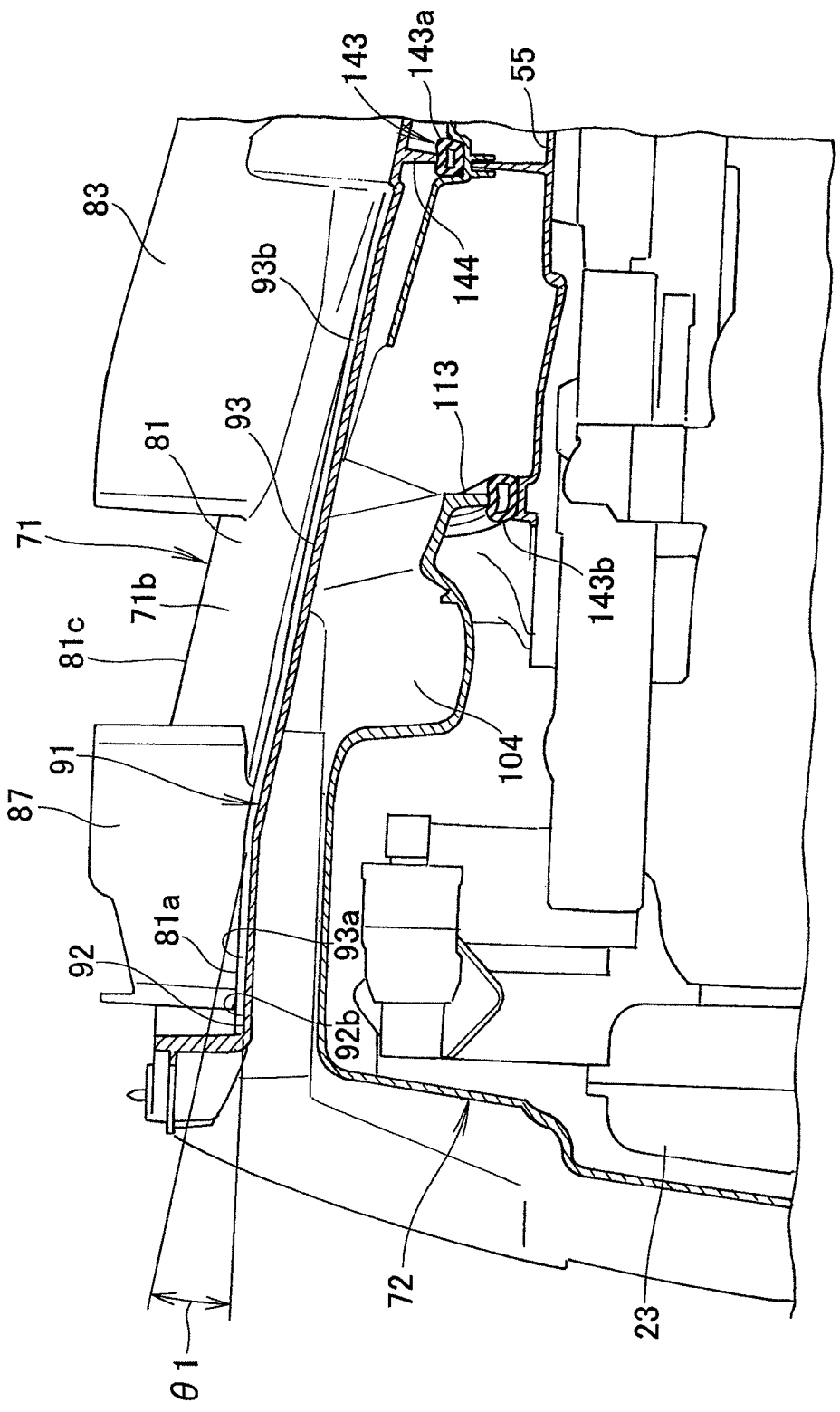
FIG. 12 is a cross sectional view taken along line 12-12 in FIG. 10.

As shown in FIGS. 10 and 12, the side drain groove sections 93 extend frontward from the outside edge sections 92b of the rear drain groove section 92, and thereby, like the guide bottom section 81, are formed to have a downward pitch of a slope angle $\theta 1$ (see FIG. 12) towards the intake openings 26 from the air intake guide section 87. Consequently, water inside the side drain groove sections 93 can be guided towards the front end sections 93b from the rear end sections 93a.

As mentioned above, the front end sections 93b of the side drain groove sections 93 are positioned in the approximate center of the intake openings 26 in the longitudinal direction. Consequently, water directed into the side drain groove sections 93 from the rear drain groove section 92 and the guide bottom section 81 is guided towards the intake openings 26 through the side drain groove sections 93. In so doing, water that has been separated in the air intake guide section 87 is reliably drained to the outside 35 of the engine cover 24 through the intake openings 26.

Figure 11:
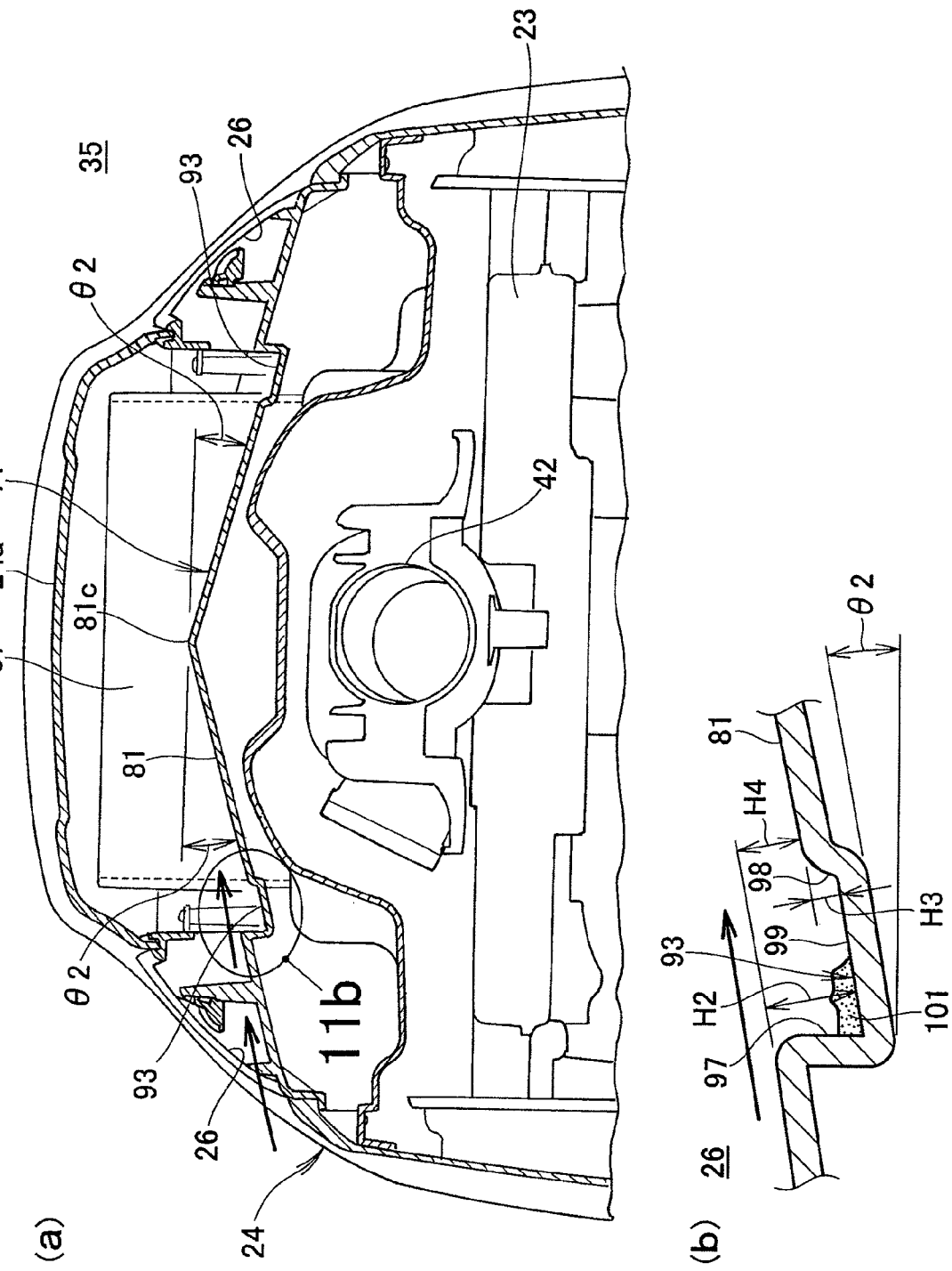
FIG. 11 (a) is a cross sectional view taken along line 11a-11a in FIG. 10.

As shown in FIG. 11 (*a*), the side drain groove sections 93 have an outer groove wall 97 disposed closer, towards the intake openings 26, an inner groove wall 98 disposed further away from the intake openings 26, and a slot bottom section 99 connecting the inner groove wall 98 and the outer groove wall 97 at the bottom end. The side drain groove sections 93 are formed to a generally "U" shaped cross section defined by the inner groove wall 98, the outer groove wall 97, and the slot bottom section 99.

Like the guide bottom section 81, the slot bottom section 99 is formed to have a downward pitch of a slope angle θ2 towards the outside in the width direction of the guide bottom section 81 (specifically, towards the plurality of guide plates 95 (FIG. 10)). In the side drain groove sections 93, the height H2 of the outer groove wall 97 is greater than the height H3 of the inner groove wall 98. Consequently, the outer groove wall 97 is taller by a height H4 (H2-H3) in relation to the inner groove wall 98. The reason for making the outer groove wall 97 taller by the height H4 than the inner groove wall 98 shall be described in detail below.

As shown in FIG. 12, the side drain groove sections 93 are formed to have a progressively shallower slot depth going from the air intake guide section 87 towards the front end sections 93b. By adopting progressively shallower slot depths for the side drain groove sections 93, the height H2 of the outer groove wall 97 (FIG. 11 (b)) becomes progressively shorter going from the air intake guide section 87 towards the front end sections 93b.

Thus, the side drain groove sections 93 are formed to have a downward pitch of a slope angle θ1 towards the intake openings 26 from the air intake guide section 87, and the height H2 of the outer groove wall 97 (FIG. 11 (b)) is progressively less from the air intake guide section 87 towards the front end sections 93b. Consequently, water inside the side drain groove sections 93 can be reliably guided from the rear end sections 93a towards the front end sections 93b.

The water that has been guided to the front end sections 93b drains as shown by the arrows in FIG. 10, from the front end sections 93b to the outside 35 of the engine cover 24 through the plurality of guide plates 95 and the intake openings 26. This allows water that has been drawn in together with air through the intake openings 26 to be reliably separated from the air.

The reason for making the outer groove wall 97 shown in FIG. 11 (b) taller by the height H4 than the inner groove wall 98 shall be described here. As shown in FIGS. 10 and 11 (a), air drawn in towards the air intake guide section 87 from the intake openings 26 flows above the side drain groove sections 93 so as to cross the side drain groove sections 93, as shown by the arrows. Therefore, it may occur that the water inside the side drain groove sections 93 could be caused to splash outside the side drain groove sections 93 by air flowing above the side drain groove sections 93.

As shown in FIG. 11 (b), the outer groove wall 97 is higher than the inner groove wall 98 by height H4. Consequently, water 101 inside the side drain groove sections 93 can be largely isolated from air flowing above the side drain groove sections 93 as shown by the arrow. This allows the water 101 inside the side drain groove sections 93 to be prevented from splashing to the outside of the side drain groove sections 93 due to air flowing above the side drain groove sections 93. Consequently, the water 101 inside the side drain groove sections 93 can be guided towards the intake openings 26 (specifically, into the front end sections 93b) and reliably drained to the outside 35 of the engine cover 24 through the intake openings 26.

As shown in FIG. 9, the rear duct 72 is disposed below a rear half section 71b of the air guide 71. The rear duct 72 is disposed downstream of the air intake guide section 87 and located near the rear wall 24c of the engine cover 24 (see FIG. 8).

Figure 13:
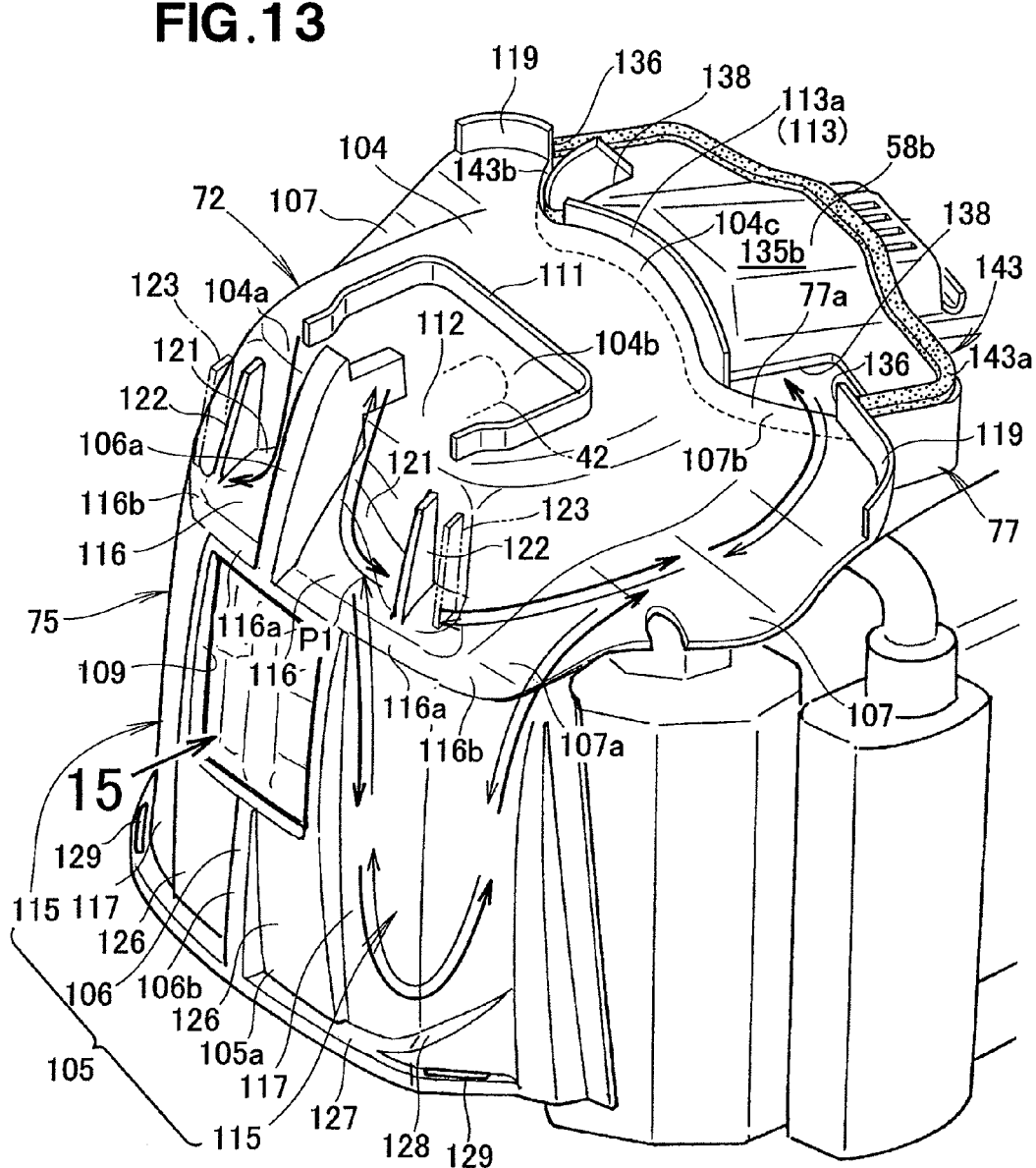
FIG. 13 is a perspective view of the rear duct shown in FIG. 9.
Figure 14:
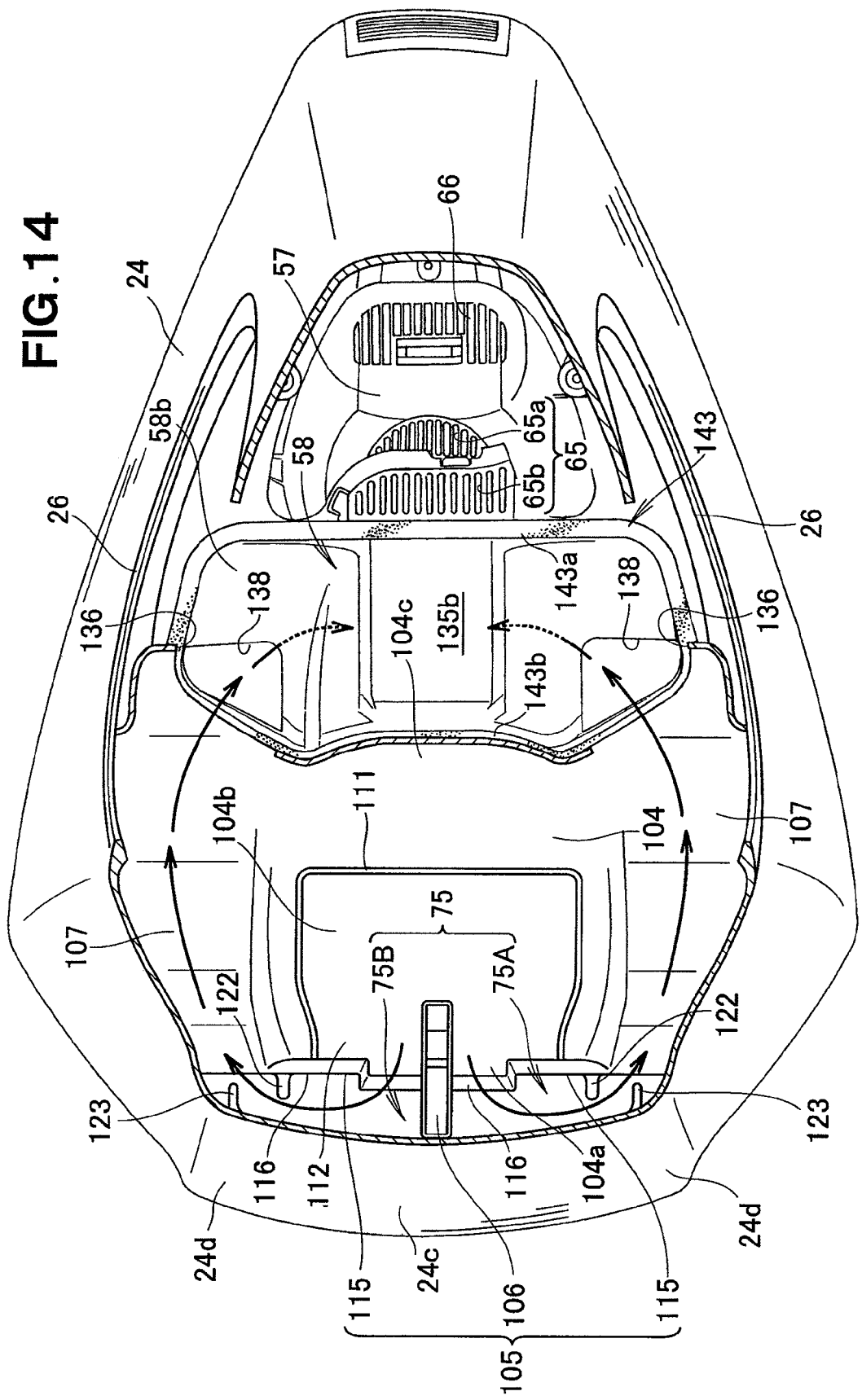
FIG. 14 is a cross sectional view taken along line 14-14 in FIG. 1.

As shown in FIGS. 13 and 14, this rear duct 72 includes a mounting section 104 onto which it is possible to mount the air intake guide section 87 of the air guide 71 (FIG. 10), a vertical duct section (duct) 105 suspended downward from a rear end section 104a of the mounting section 104, and side guide sections 107 extending frontward from both sides of the vertical duct section 105.

The mounting section 104 is a region that covers the throttle body 42 from above. This mounting section 104 has a mating wall section 111 projecting upward from a rear half section 104b, and a rear partition wall 113 projecting in a vertical direction from a front edge 104c (FIGS. 3, 4). The mating wall section 111 has a guide port 112 that opens out in a rear end section thereof, and is designed to mate with the air intake guide section 87 of the air guide 71.

When the air intake guide section 87 has been mated with the mating wall section 111, the air intake guide section 87 communicates with the vertical duct section 105 through the guide port 112. Consequently, air directed into the air intake guide section 87 is guided through the guide port 112 and downward along the vertical duct section 105.

Figure 15:
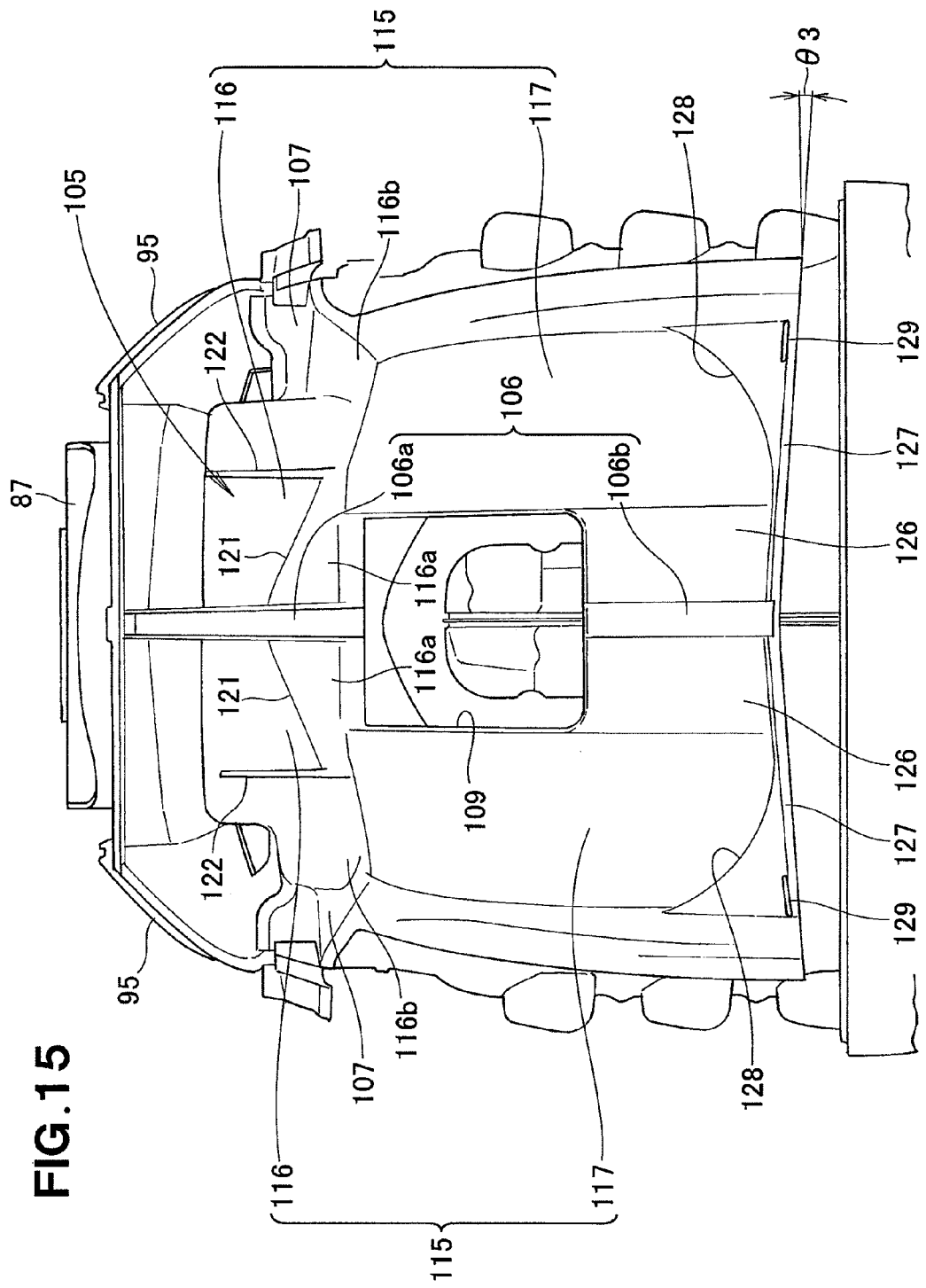
FIG. 15 is a view taken in the direction of arrow 15 in FIG. 13.

As shown in FIGS. 13 and 15, the vertical duct section 105 is a duct of vertical design provided with a center partition section 106 capable of bisecting the vertical duct section 105 in a vertical direction, and a pair of segmented duct sections (duct sections) 115 bisected by the center partition section 106.

Figure 16:
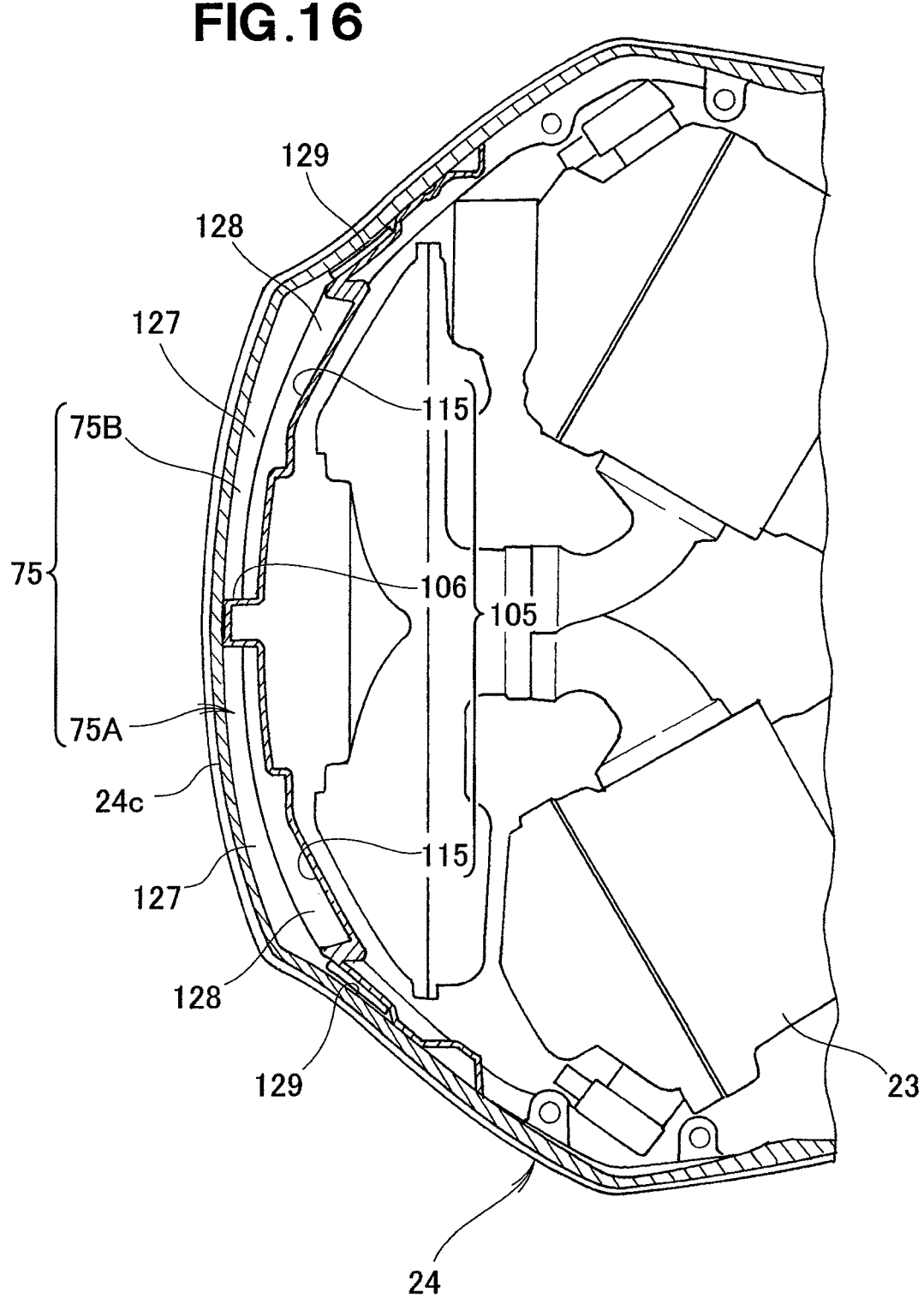
FIG. 16 is a cross sectional view taken along line 16-16 in FIG. 2.

As shown in FIG. 16, the vertical duct section 105 is covered by the rear wall 24c of the engine cover 24. When the vertical duct section 105 is covered by the rear wall 24c of the engine cover 24, the discharging/interference-type muffler means 75 is formed by the vertical duct section 105 and the rear wall 24c of the engine cover 24.

As shown in FIGS. 13 and 15, the center partition section 106 has an upper center partition section 106a extending downward to a rectangular opening 109 from the rear end section 104a of the mounting section 104, and a lower center partition section 106b extending from the rectangular opening 109 to a lower end section 105a of the vertical duct section 105. By thus providing the center partition section 106 in the vertical duct section 105, the vertical duct section 105 is segmented to either side of the center partition section 106.

By virtue of a bisected structure in which the vertical duct section 105 is segmented to either side of the center partition section 106, the pair of segmented duct sections 115 is created in the vertical duct section 105. In so doing, when air inside the air intake guide section 87 is guided downwardly into the vertical duct section 105 through the guide port 112, the flow of air inside the air intake guide section 87 gets divided between the pair of segmented duct sections 115 by the center partition section 106.

The segmented duct sections 115 include, in a duct of vertical design, an upper duct section 116 descending from the rear end section 104a of the mounting section 104, and a lower duct section 117 descending from a lower end section 116a of the upper duct section 116.

In the upper duct sections 116, descending step sections 121 are disposed to the sides of the center partition section 106, and guide ribs 122 are disposed within the descending step sections 121.

The descending step sections 121 are formed to have a downward pitch towards the guide ribs 122 from the center partition section 106. Consequently, air being guided downwardly into the upper duct sections 116 is guided in lateral directions towards the guide ribs 122 by the descending step sections 121, as shown by the arrows.

The guide ribs 122 are disposed in a vertical orientation in proximity to the sides of the upper duct sections 116, and project rearward from the upper duct sections 116. These guide ribs 122 are capable of guiding air directed into the upper duct sections 116 towards separation ribs 123 as shown by the arrows (FIG. 14).

Here, as shown in FIGS. 2 and 14, the separation ribs 123 are disposed on rear wall 24c of the engine cover 24 in regions 24d thereof opposed to the upper duct sections 116. The separation ribs 123 are disposed to the outside of the guide ribs 112, and project towards the upper duct sections 116. The separation ribs 123 are disposed in a vertical orientation substantially parallel to the guide ribs 122.

By thus providing the separation ribs 123 in proximity to either side of the upper duct sections 116, the flow of air guided laterally by the upper duct sections 116 is impeded by the separation ribs 123. Because the flow of air is impeded by the separation ribs 123, water present in the air collides against the separation ribs 123, and the water can be separated from the air.

Furthermore, the water that has been separated by the separation ribs 123 can be made to drip downward along the separation ribs 123. This allows the water contained in the air to be reliably separated from the air by the separation ribs 123.

As shown in FIGS. 8 and 9, the intake passage 73 includes a dual system having the first intake passage section 73A and the second intake passage section 73B. Furthermore, the one segmented duct section 115 is disposed in the first intake passage section 73A, while the other segmented duct section 115 is disposed in the second intake passage section 73B. Furthermore, on the engine cover 24, the separation ribs 123 are disposed in a region opposed to the one segmented duct section 115, and in a region opposed to the other segmented duct section 115.

Consequently, the flow of air guided into the first intake passage section 73A is impeded by the separation rib 123, whereupon water flowing into the first intake passage section 73A can be separated from the air by the separation rib 123. Likewise, the flow of air guided into the second intake passage section 73B is impeded by the separation rib 123, whereupon water flowing into the second intake passage section can be separated from the air by the separation rib 123. This allows the water drawn in together with the air to be reliably separated from the air by the separation ribs 123.

As shown in FIG. 14, the guide ribs 122 are disposed upstream of the separation ribs 123. Consequently, air guided into the upper duct sections 116 can be guided satisfactorily towards the separation ribs 123 by the guide ribs 122 as shown by the arrows, and water directed in together with the air can be induced to collide in an appropriate manner against the separation ribs 123. This allows the water drawn in together with the air to be reliably separated from the air by the separation ribs 123. The shapes of the separation ribs 123 and the guide ribs 122 have been determined in such a way that the air intake resistance is not increased by the plurality of separation ribs 123 and guide ribs.

As shown in FIGS. 13 and 15, center protruding sections 126 that protrude rearward from the center in the width direction are disposed in the lower duct sections 117, and ascending steps 128 are disposed at locations to the outside of the center protruding sections 126 and above a bottom section 127. Drain ports 129 are disposed at outside edge sections of the bottom section 127 (to the lower side of the ascending steps 128). The bottom section 127 is formed to have a downward pitch of slope angle θ3 towards the outside from the center partition section 106.

Specifically, the drain ports 129 are disposed in the lowermost section of the bottom section 127. The water separated from the air by the separation ribs 123 (see also FIG. 14) drips down onto this bottom section 127. Consequently, the water that has dripped down onto the bottom section 127 is guided along the bottom section 127 and into the drain ports 129, and drains to the outside of the lower duct sections 117 through the drain ports 129.

When the downward flow of air guided into the upper duct sections 116 is redirected laterally by the descending step sections 121 as shown by the arrows, some of the air is directed downwardly towards the lower duct sections 117 as shown by the arrows. The downwardly directed air rises along the ascending steps 128 as shown by the arrows.

The side guide sections 107 have side partition walls 119 that extend frontward to outside sections 77a of the silencer 77 from outside lower edge sections 116b of the upper duct sections 116, and that project upward from front end sections 107b.

One of the side guide sections 107 forms part of the first intake passage section 73A (FIG. 9). The other side guide section 107 forms part of the second intake passage section 73B. The following description relates to the one side guide section 107 only, omitting description of the other side guide section 107.

The side guide section 107 communicates at a rear end section 107a thereof with the descending step section 121, and at a front end section 107b communicates with an inlet port 136 of the silencer 77.

The side partition wall 119 is disposed at predetermined spacing away from the rear partition wall 113. Furthermore, the upper end of the side partition wall 119 and the upper end of the rear partition wall 113 abut the back surface of the guide bottom section 81 (FIG. 4). Consequently, the inlet port 136 of the silencer 77 is formed between the side partition wall 119 and the rear partition wall 113.

The front end section 107b of the side guide section 107 communicates with the inlet port 136. Consequently, the air from which water has been separated by the separation rib 123 of the upper duct section 116 is directed into the side guide section 107 as shown by the arrows. The air directed into the side guide section 107 is directed through the side guide section 107 and into a silencer chamber 135 from the inlet port 136 of the silencer 77 as shown by the arrows.

Meanwhile, air directed downward into the lower duct section 117 rises along the ascending step 128 as shown by the arrows. The rising air is directed into the side guide section 107 as shown by the arrows. The air directed into the side guide section 107 is directed through the side guide section 107 and into the silencer chamber 135 from the inlet port 136 of the silencer 77 as shown by the arrows.

As shown in FIGS. 13 and 14, the interference-type muffler section 75A is formed by the segmented duct section 115, in combination with the rear wall 24c of the engine cover 24. The interference-type muffler section 75A includes a function of reducing air intake noise transmitted from the inlet port 136 of the silencer 77. The interference-type muffler section 75A shall be discussed in detail below.

As shown in FIG. 4, the silencer 77 includes a body section 132 formed by a rear section 55b of the belt cover 55, and a rear section of the fan cover 56, and a cover section 133 formed above the body section 132. The silencer 77 includes the silencer chamber 135.

Figure 17:
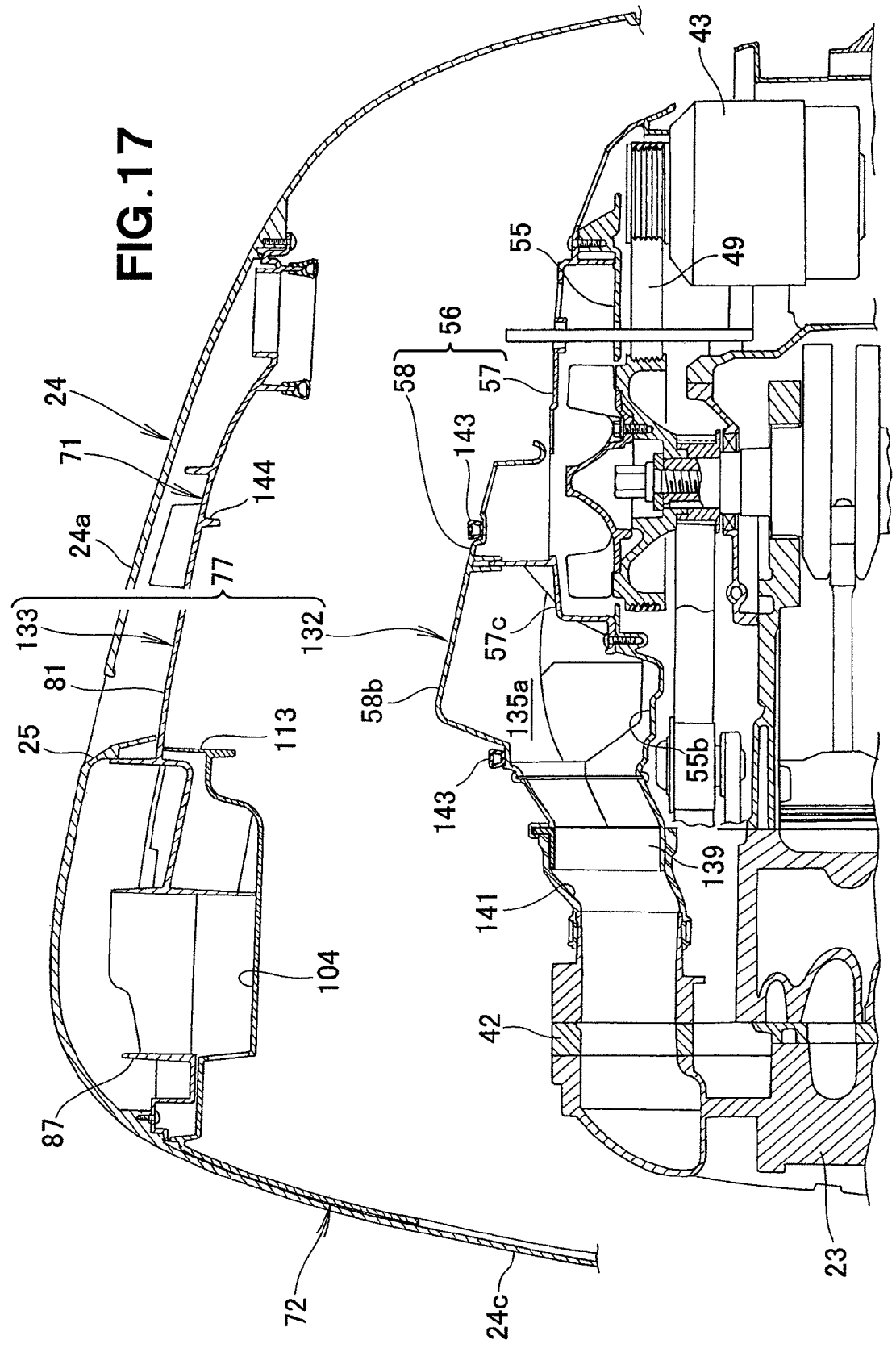
FIG. 17 is an exploded cross sectional view of a silencer shown in FIG. 3.

As shown in FIG. 17, the body section 132 is formed by the rear section 55b of the belt cover 55, and the rear section of the fan cover 56 (a rear section 57c of the first fan cover 57 and a rear section 58b of the second fan cover 58). Specifically, the belt cover 55 and the fan cover 56 are disposed in the body section 132. This body section 132 includes a lower half chamber (silencer lower half chamber) 135a of the silencer chamber 135 (see FIG. 4).

In the body section 132, openings 138 to the silencer lower half chamber 135a are formed in both sides of the second fan cover 58 (rear section 58b) (FIGS. 13, 14), and an outlet port 139 is formed in a rear end section. The outlet port 139 is formed by the rear section 55b of the belt cover 55 and the rear section 58b of the second fan cover 58. This outlet port 139 communicates with the throttle body 42 through a communicating passage 141.

The cover section 133 is formed above the body section 132. The cover section 133 is formed by the second fan cover 58, the guide bottom section 81, a front partition wall 144, the rear partition wall 113, and a sealing material 143.

As shown in FIGS. 12 and 14, the sealing material 143 is formed into a frame shape that is substantially pentagonal in plan view and is disposed on the upper surface of the second fan cover 58 (the rear section 58b). As shown in FIG. 4, a front half section 143a of the sealing material 143 is pressed from above by the lower end of the front partition wall 144. The front partition wall 144 is a projecting piece that projects downward from the back surface of the guide bottom section 81. Furthermore, a rear half section 143b of the sealing material 143 (see also FIGS. 12 and 14) is pressed from above by the lower end of the rear partition wall 113. The rear partition wall 113 at its upper end abuts the back surface of the guide bottom section 81.

Through pressing of the front half section 143a of the sealing material 143 by the front partition wall 144, and pressing of the rear half section 143b of the sealing material 143 by the rear partition wall 113, the cover section 133 of the silencer 77 is formed by the second fan cover 58, the front partition wall 144, the rear partition wall 113, and the guide bottom section 81.

As shown in FIG. 17, the guide bottom section 81 (specifically, the air guide 71) is disposed on the engine cover 24. Consequently, the cover section 133 is disposed on the body section 132 so as to permit detachment from above. This cover member 133 includes an upper half section (silencer upper half chamber) 135b of the silencer 135 (FIG. 4). The silencer upper half chamber 135b and the silencer lower half chamber 135a communicate through the openings 138 (FIG. 14).

In this silencer 77, the inlet port 136 (FIG. 14) communicates with the side guide section 107, and the outlet port 139 communicates with the throttle body 42 via the communicating passage 141. Consequently, as shown in FIG. 14, air directed into the side guide section 107 from the inlet port 136 as shown by the arrows is directed from the inlet port 136 into the silencer upper half chamber 135b (FIG. 4) as shown by the arrows. The air directed into the silencer upper half chamber 135b is directed through the openings 138 and into the silencer lower half chamber 135a as shown by the arrows.

Figure 18:
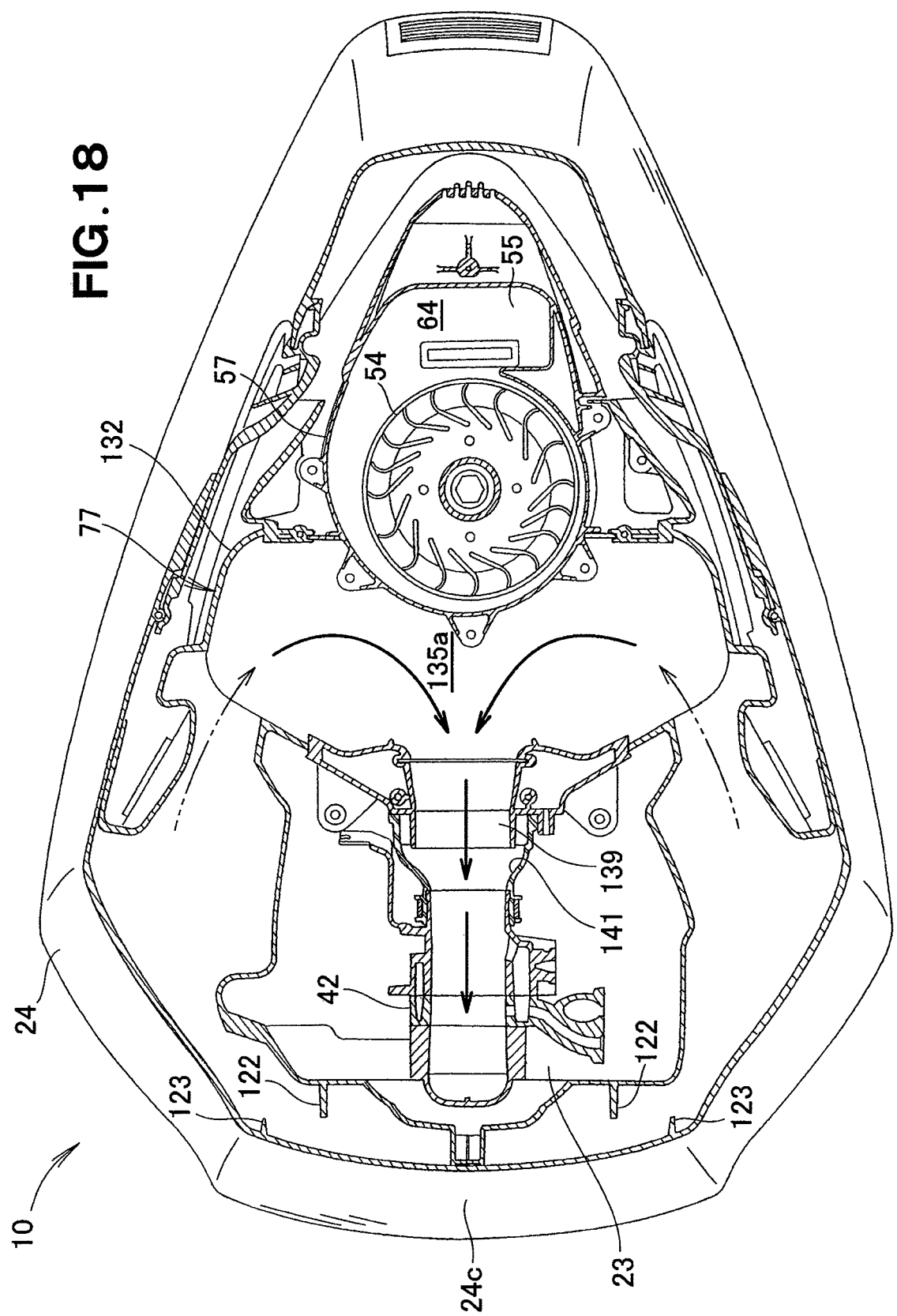
FIG. 18 is a cross sectional view taken along line 18-18 in FIG. 1.

As shown in FIG. 18, the air directed into the silencer lower half chamber 135a is directed into the throttle body 42 through the outlet port 139 and the communicating passage 141. The throttle body 42 communicates with the combustion chamber of the engine 23. When air intake noise is produced along with air intake pulsations and shock waves when the engine 23 is being driven, this silencer 77 includes the function of reducing the air intake noise produced thereby.

As shown in FIG. 4, in the silencer 77, the body section 132 is disposed on the belt cover 55 and the fan cover 56, and the cover section 133 is disposed on the engine cover 24. The reason for disposing the body section 132 on the belt cover 55, and for disposing the cover section 133 on the engine cover 24, shall be described below.

In an ordinary outboard motor, the silencer is disposed between the engine cover and the belt cover. In cases in which the silencer is disposed between the engine cover and the belt cover, it may occur that the silencer could interfere with the engine cover and the belt cover. For this reason, it is necessary to provide a gap between the engine cover and the silencer, and between the belt cover and the silencer, in order to prevent interference by the silencer.

By contrast, in the outboard motor 10 of the present embodiment, the body section 132 of the silencer 77 is disposed on the belt cover 55 and the fan cover 56, while the cover section 133 of the silencer 77 is disposed on the engine cover 24. Consequently, gaps for preventing interference can be eliminated from between the engine cover 24 and the silencer 77, and from between the belt cover 55 (including the fan cover 56) and the silencer 77.

This allows gaps for preventing interference to be repurposed as space for increasing the capacity of the silencer 77. Consequently, it is possible to increase the capacity of the silencer 77 without making the engine cover 24 larger, and air intake noise in the intake channel 73 (air intake noise produced along with air intake pulsations and shock waves) can be reduced to a sufficient extent.

Furthermore, as shown in FIG. 17, the cover section 133 of the silencer 77 is disposed on the chassis section 132 so as to be detachable therefrom from above. Consequently, the silencer chamber 135 (FIG. 4) can be opened up by detaching the cover section 133 from the body section 132. This allows grit and dust that has infiltrated into the silencer chamber 135 to be easily eliminated without undue effort.

Still further, the sealing material 143 is disposed between the body section 132 and the cover section 133. This ensures a hermetic seal between the body section 132 and the cover section 133, and air intake noise in the intake channel 73 (FIG. 9) can be sufficiently reduced by the silencer 77.

Next, the discharging/interference-type muffler means 75 shall be discussed in detail on the basis of FIGS. 13 and 16. As shown in FIGS. 13 and 16, the discharging/interference-type muffler means 75 is disposed in a vertical arrangement inside the engine cover 24, and, due to being bisected in a vertical direction by the center partition section 106, includes the pair of interference-type muffler sections (side branches) 75A, 75B.

The one interference-type muffler section 75A is formed by the one segmented duct section 115, and a region in the rear wall 24c of the engine cover 24 which is opposed to the one segmented duct section 115. The interference-type muffler section 75A is disposed partway along the first intake passage section 73A (FIG. 9), and communicates with the throttle body 42 through the silencer 77.

The other interference-type muffler section 75B is formed by the other segmented duct section 115, and a region in the rear wall 24c of the engine cover 24 which is opposed to the other segmented duct section 115. The interference-type muffler section 75B is disposed partway along the second intake passage section 73B (FIG. 9), and communicates with the throttle body 42 through the silencer 77. The throttle body 42 communicates with the combustion chamber of the engine 23.

As shown in FIGS. 13 and 18, when air intake noise is produced along with air intake pulsations and shock waves while the engine 23 is being driven, the air intake noise produced thereby is directed from the inlet ports 136 of the silencer 77 to the side guide sections 107 as shown by the arrows. The air intake noise directed into the side guide sections 107 is directed from the side guide sections 107 into the upper duct sections 116 as shown by the arrows, and then guided into the lower duct sections 117 as shown by the arrows.

The air intake noise directed into the lower duct sections 117 is transmitted downward inside the lower duct sections 117 and reaches the ascending steps 128 as shown by the arrows. The flow of air intake noise transmitted to the ascending steps 128 is redirected upward through the ascending steps 128 and the center protruding sections 126 as shown by the arrows. At an interference position P1, the air intake noise directed upward from the lower duct sections 117 interferes with the air intake noise that has been directed into the upper duct sections 116 from the side guide sections 107.

At the interference position P1, the air intake noise directed into the upper duct sections 116 from the lower duct sections 117 (second air intake noise) undergoes inversion of the phase of its frequency with respect to the air intake noise directed directly into the upper duct sections 116 from the side guide sections 107 (first air intake noise).

Specifically, the pair of interference-type muffler sections 75A, 75B is formed such that the phase of the frequency of the second air intake noise is inverted with respect to that of the first air intake noise at the interference position P1. In specific terms, the phase of the frequency of the second air intake noise is inverted with respect to that of the first air intake noise, through adjustments to the passage area and the passage length for the first air intake noise and the second air intake noise. By so causing the phase-inverted second air intake noise to interfere with the first air intake noise at the interference position P1, air intake noise transmitted from the inlet port 136 of the silencer 77 can be reduced.

With the discharging/interference-type muffler means 75, it is possible to attenuate the frequency band of air intake noise which, in exhaust noise, is a component producing particularly high acoustic pressure. In so doing, when air intake noise is produced along with air intake pulsations and shock waves while the engine 23 is being driven, the air intake noise can be sufficiently reduced by the discharging/interference-type muffler means 75.

As shown in FIGS. 13 and 16, in the outboard motor 10, it is typical for dead space to be present between the side walls (particularly the rear wall 24c) of the engine cover 24 and the engine 23. By providing the discharging/interference-type muffler means 75 in a vertical arrangement, this dead space can be utilized for installation of the discharging/interference-type muffler means 75. This obviates the need to ensure additional space for installation of the discharging/interference-type muffler means 75, allowing the outboard motor 10 to be made smaller (more compact).

Furthermore, the drain port 129 is provided in the bottom section 127 of the discharging/interference-type muffler means 75. The discharging/interference-type muffler means 75 is disposed in a vertical arrangement. Consequently, water that has been separated from air by the discharging/interference-type muffler means 75 can be made to drip downward to the bottom section 127. Furthermore, the water that has dripped down to the bottom section 127 can be drained out from the discharging/interference-type muffler means 75 through the drain port 129. This allows air from which water has been separated by the discharging/interference-type muffler means 75 to be guided into the throttle body 42 (FIG. 18).

Specifically, the discharging/interference-type muffler means 75 is provided both with a sound deadening function for reducing air intake noise, and a water separation function for separating water from air. This obviates the need to provide individual members respectively having a sound deadening function and a water separation function, and therefore the outboard motor 10 can be made even smaller (more compact).

Figure 19:
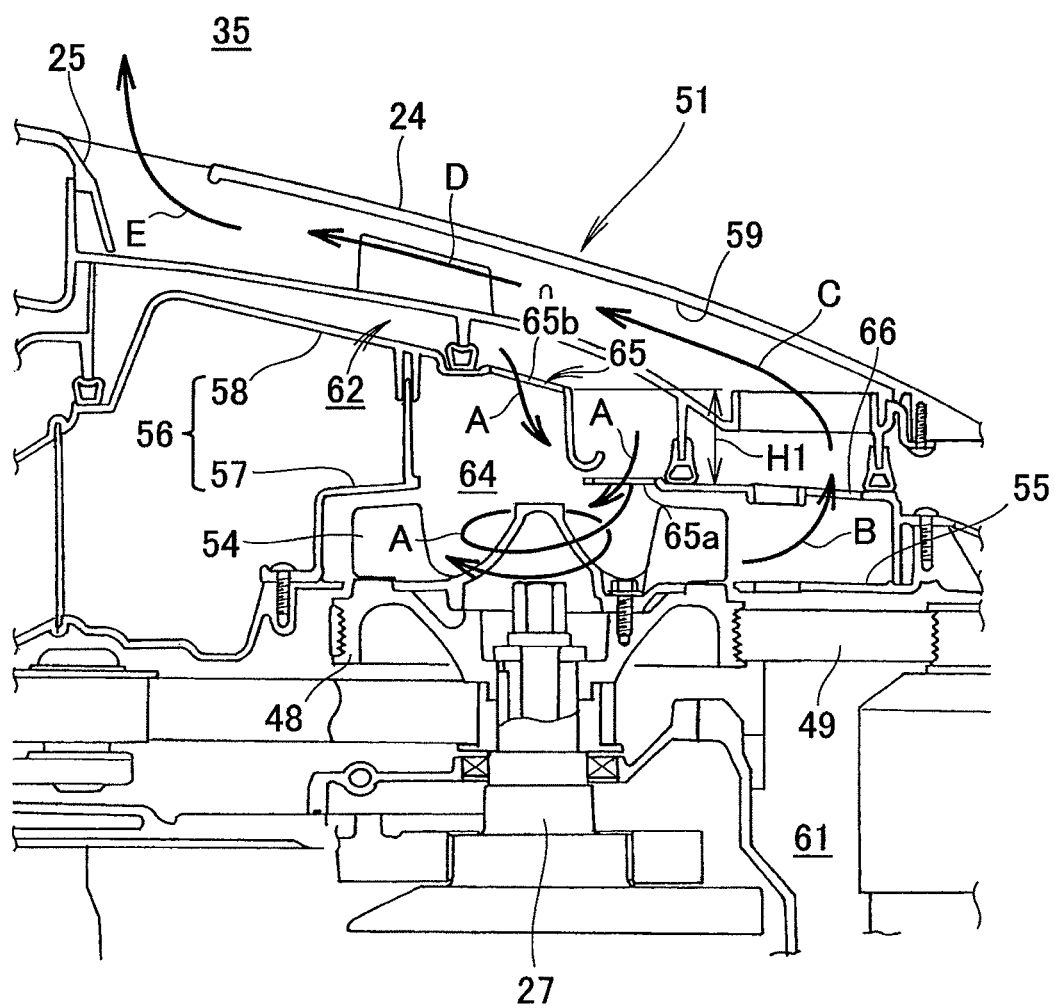
FIG. 19 is a diagrammatical view illustrative of the manner in which air inside the engine cover is discharged to the outside by exhaust means according to the present embodiment.

Next, an example in which air inside the engine cover 24 is discharged to the outside 35 by the exhaust means (venting means) 51 shall be described on the basis of FIG. 19. As shown in FIG. 19, a step H1 is provided between the first fan cover 57 and the second fan cover 58. The first air intake port 65a is formed in the first fan cover 57, and the second air intake port 65b is formed in the second fan cover 58.

Through rotation of the exhaust fan 54, the air in the intake/exhaust chamber 62 is directed along a scroll shaped (volute shaped) trajectory inside the exhaust fan chamber 64, as shown by the arrows A. By directing the air in the intake/exhaust chamber 62 along a scroll shaped trajectory, the air in the intake/exhaust chamber 62 can be smoothly and efficiently drawn into the exhaust fan chamber 64.

The air drawn into the exhaust fan chamber 64 is directed through the exhaust port 66 and then outside the exhaust fan chamber 64 (specifically, into the exhaust passage 59) as shown by arrow B. The air directed into the exhaust passage 59 is then guided along the exhaust passage 59 as shown by arrow D, passes through the exhaust passage 59, and is discharged to the outside 35 of the engine cover 24 through the exhaust opening 25 as shown by arrow E.

The intake/exhaust chamber 62 communicates with the engine compartment 61. Consequently, air in the intake/exhaust chamber 62, and air in the engine compartment 61, can be reliably discharged to the outside 35 of the engine cover 24 through rotation of the exhaust fan 54. This allows the air temperature inside the intake/exhaust chamber 62 and in the engine compartment 61 to be kept at appropriate temperature.

Next, an example in which air drawn in from the outside 35 of the engine cover 24 is directed to the throttle body 42 (see FIG. 23 (b)) shall be described on the basis of FIGS. 20 to 23. To facilitate understanding of the flow of air, only the first intake passage section 73A (see FIG. 9) is described in FIGS. 20 to 23.

Figure 21:
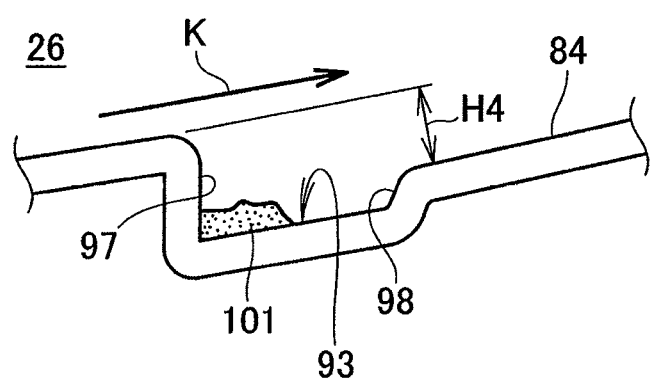
FIG. 21 is a view illustrative of the manner in which water directed into the drain groove shown in FIGS. 20(a) and 20(b) is prevented from splashing.

Firstly, an example in which water is separated from air directed into the air guide 71 through the intake opening 26 shall be described on the basis of FIGS. 20 to 21. As shown in FIG. 20 (a), air is directed towards the air guide 71 from the intake opening 26 of the engine cover 24 as shown by arrow F.

The air drawn in from the intake opening 26 is directed inside the engine cover 24 through the plurality of guide plates 95. In the process, water contained in the air collides against the plurality of guide plates 95, separating the water from the air. The air from which the water has been separated by the plurality of guide plates 95 is directed along the guide bottom section 81 of the air guide 71, to the air intake guide section 87.

By directing the air to the air intake guide section 87, the air drawn in from the intake opening 26 is redirected upward by the air intake guide section 87 as shown by arrow G. Consequently, the water contained in the air collides against the outside peripheral surface of the air intake guide section 87, separating the water from the air. The air from which the water has been separated by the air intake guide section 87 is drawn inside the air intake guide section 87 from the air intake port 87b of the air intake guide section 87. The air drawn inside the air intake guide section 87 is directed downward (in a vertical direction) as shown by arrow H.

As shown in FIG. 20 (b), the water separated from the air by the air intake guide section 87 drips down along the outside peripheral surface of the air intake guide section 87 and is directed into the rear drain groove section 92 and the side drain groove section 93 at either side. The water directed into the rear drain groove section 92 and the side drain groove section 93 at either side is guided along the side drain groove section 93 at either side to the front end section 93b as shown by arrow I. The water guided to the front end section 93b is drained to the outside 35 of the engine cover 24 through the intake opening 26 from the front end section 93b as shown by arrow J.

As shown in FIG. 21, the outer groove wall 97 is higher than the inner groove wall 98 by height H4. Air drawn in towards the air intake guide section 87 from the intake opening 26 flows above the side drain groove section 93 in such a way as to cross the side drain groove section 93, as shown by arrow K. Consequently, by making the outer groove wall 97 higher than the inner groove wall 98 by height H4, water 101 inside the side drain groove section 93 can be largely isolated from the air flowing above the side drain groove section 93.

This allows the water 101 inside the side drain groove section 93 to be prevented from splashing to the outside of the side drain groove section 93 due to the air flowing above the side drain groove section 93. Consequently, the water 101 inside the side drain groove section 93 can be guided satisfactorily towards the front end section 93b (FIG. 20 (b)), and reliably drained to the outside 35 of the engine cover 24 through the intake opening 26 (FIG. 20 (b)).

Figure 22:
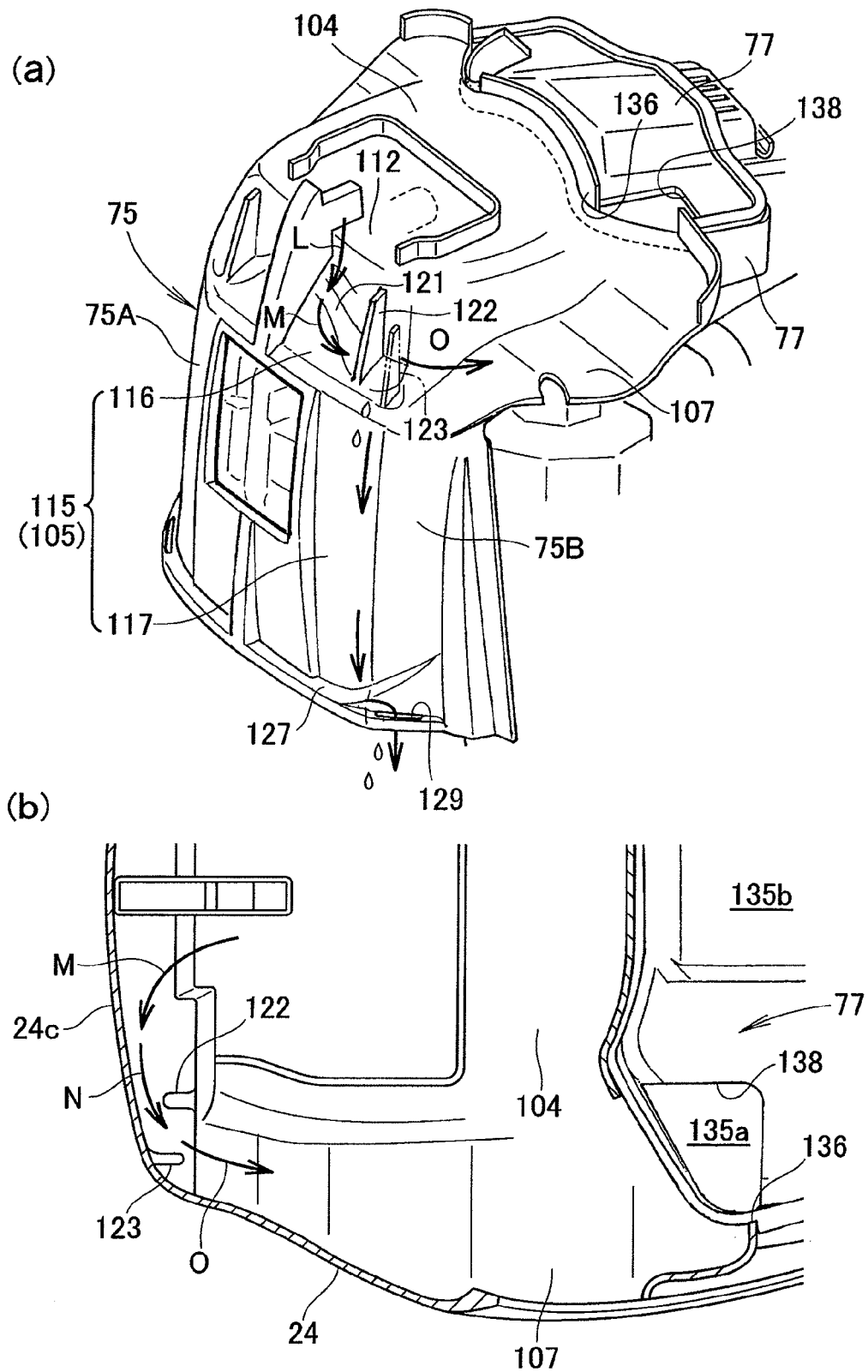
FIG. 22(a) and FIG. 22B are views illustrative of the manner in which water is separated from air by a separation rib of a discharging/interference-type muffing means shown in FIG. 7.

Next, an example in which water is separated from air directed into the segmented duct section 115 of the discharging/interference-type muffler means 75 shall be described on the basis of FIGS. 22 and 23. As shown in FIG. 22 (a), air directed into the air intake guide section 87 (FIG. 20 (a)) is directed through the guide port 112, and downward along the upper duct section 116 of the vertical duct section 105 as shown by arrow L. The air guided downward into the upper duct section 116 is guided laterally towards the guide rib 122 by the descending step section 121 as shown by arrow M.

As shown in FIG. 22 (b), the air guided towards the guide rib 122 is then guided towards the separation rib 123 by the guide rib 122 as shown by arrow N. By guiding the air towards the separation rib 123, the airflow can be impeded by the separation rib 123. Having the flow of air impeded by the separation rib 123 causes the water in the air to collide against the separation rib 123, separating the water from the air. The air from which the water has been separated by the separation rib 123 is directed towards the side guide section 107 as shown by arrow O.

Meanwhile, as shown in FIG. 22 (a), the water separated from the air by the separation rib 123 drips down to the bottom section 127 as shown by the arrows. The water dripping down to the bottom section 127 is guided along the bottom section 127 to the drain port 129, and drains to outside the lower duct section 117 through the drain port 129.

As shown in FIG. 23 (a), some of the air guided downward into the upper duct section 116 as shown by arrow L is guided further downward into the lower duct section 117 as shown by arrow P. The downwardly guided air rises along the ascending step 128 as shown by arrow Q. The rising air is directed to the side guide section 107 as shown by arrow R.

The air directed to the side guide section 107 as shown by arrow O and the air directed to the side guide section 107 as shown by arrow R is then directed through the side guide section 107, and into the silencer upper half chamber 135b of the silencer chamber 135 from the inlet port 136 of the silencer 77 as shown by arrow S. The air directed into the silencer upper half chamber 135b is directed through the opening 138 of the silencer 77 and into the silencer lower half chamber 135a as shown by arrow T.

As shown in FIG. 23 (b), the air directed into the silencer lower half chamber 135a is then directed towards the outlet port 139 of the silencer chamber 135 as shown by arrow U. The air directed towards the outlet port 139 of the silencer chamber 135 is then directed to the throttle body 42 through the communicating passage 141 as shown by arrow V.

As described in FIGS. 20 to 23, by virtue of the plurality of guide plates 95, the air intake guide section 87, and the separation rib 123 provided on the one interference-type muffler section 75A, water can be separated from air to a sufficient extent. Consequently, the throttle body 42 can be supplied with air from which water has been separated to a sufficient extent (specifically, air that does not contain moisture).

Next, an example in which air intake noise produced along with air intake pulsations and shock waves while the engine 23 is being driven is reduced by the silencer 77 and the discharging/interference-type muffler means 75 shall be described on the basis of FIG. 24. To facilitate understanding of the example of reduction of air intake noise, in FIG. 24, only the first intake passage section 73A (FIG. 9) is described.

As shown in FIG. 24 (a), air intake noise is produced along with air intake pulsations and shock waves while the engine 23 is being driven. The produced air intake noise is transmitted through the throttle body 42 to the silencer lower half chamber 135a of the silencer 77 shown in FIG. 24 (b), as shown by arrow W.

As shown in FIG. 24 (b), the silencer lower half chamber 135a communicates with the silencer upper half chamber 135b through the opening 138. Consequently, air intake noise is reduced through attenuation by the silencer 77 (the silencer chamber 135 (FIG. 4)).

The air intake noise attenuated by the silencer 77 is transmitted from the inlet port 136 of the silencer 77 to the side guide section 107 as shown by arrow X. The air intake noise transmitted to the side guide section 107 is then transmitted to the one interference-type muffler section 75A through the side guide section 107.

In specific terms, the air intake noise transmitted to the side guide section 107 is transmitted from the side guide section 107 to the upper duct section 116 as shown by arrow Y, and then transmitted to the lower duct section 117 as shown by arrow Z. The air intake noise transmitted to the upper duct section 116 is transmitted through the upper duct section 116 to the guide port 112 as shown by the arrow Y.

Meanwhile, the air intake noise transmitted to the lower duct section 117 is transmitted downward inside the lower duct section 117 to the ascending step 128 as shown by the arrows Z. The flow of the air intake noise transmitted to the ascending step 128 is redirected upward through the ascending step 128 and the center protruding section 126 as shown by the arrows Z. At the interference position P1, the upwardly transmitted air intake noise (second air intake noise) interferes with the air intake noise (first air intake noise) that was directed from the side guide section 107 to the upper duct section 116 as shown by the arrow Y.

At the interference position P1, the air intake noise (second air intake noise) transmitted from the lower duct section 117 to the upper duct section 116 as shown by the arrows Z undergoes an inversion of the phase of the frequency with respect to the air intake noise (first air intake noise) directed from the side guide section 107 to the upper duct section 116 as shown by the arrow Y. Through interference of the inverted-phase second air intake noise with the first air intake noise at the interference position P1 in this manner, the air intake noise transmitted from the inlet port 136 of the silencer 77 can be reduced.

As described in FIG. 24, the silencer 77 and the discharging/interference-type muffler means 75 (the one interference-type muffler section 75A) are included in the first intake passage section 73A. This allows air intake noise to be reduced by both the silencer 77 and the one interference-type muffler section 75A, which enables air intake noise to be adequately reduced.

The outboard motor according to the present invention is not limited to the embodiment described above, and various modifications and improvements are possible. For example, the shapes and configurations of the outboard motor 10, the engine 23, the engine cover 24, the intake openings 26, the auxiliary machinery 41, the throttle body 42, the drive belt 49, the belt cover 55, the intake passage 73, the pair of intake passage sections 73A, 73B, the discharging/interference-type muffler means 75, the pair of interference-type muffler sections 75A, 75B, the silencer 77, the guide bottom section 81, the air intake guide section 87, the drain groove 91, the outer groove wall 97, the inner groove wall 98, the pair of segmented duct sections 115, the guide ribs 122 and the separation ribs 123, the silencer 77 and the drain port 129, the body section 132, the cover section, the silencer chamber 135, the silencer lower half chamber 135b, the silencer upper half chamber 135a, the sealing material 143, and the like are not limited to the exemplary ones shown herein; various modifications are possible.

INDUSTRIAL APPLICABILITY

The present invention is suited to application in an outboard motor in which an engine is disposed within an engine cover, and air drawn inside the engine cover is allowed to be introduced into a throttle body.

REFERENCE SIGNS LIST

10: Outboard motor
23: Engine
24: Engine cover
24b Both lateral sides of engine cover
24c Rear wall of engine cover
26: Intake openings (openings)
35: Outside section of engine cover
41: Auxiliary Machinery
42: Throttle body
49: Drive belt
55: Belt cover
73: Intake passage
73A, 73B: Pair of intake passage sections
75: Discharging/interference-type muffler means (interference-type muffler)
75A, 75B: Pair of interference-type muffler sections
77: Silencer
127 Bottom section
81: Guide bottom section
87 Air intake guide section
91: Drain groove
92: Rear drain groove section
93: Side drain groove sections
97: Outer groove wall
98: Inner groove wall
105: Vertical duct section (duct section)
115: Pair of segmented duct sections (duct sections)
122: Guide ribs
123: Separation ribs
129: Drain port
132: Body section
133: Cover section
135: Silencer chamber
135a: Silencer lower half chamber
135b Silencer upper half chamber
143: Sealing material

The invention claimed is:

1. An outboard motor comprising:
an engine;
an engine cover covering the engine, the engine cover having a first lateral side and a second lateral side opposite to the first lateral side;
first and second intake openings provided in the first and second lateral sides of the engine cover, respectively;
a throttle body for introducing air drawn inside the engine cover through the intake openings; and
an intake passage that guides air from the first and second guide openings to the throttle body,
wherein a muffler for reducing air intake noise is disposed partway along the intake passage,
wherein the muffler is disposed vertically inside the engine cover, and the muffler has an interior bisected in a vertical direction,
wherein:
the muffler with the interior thereof bisected in the vertical direction comprises a first muffler section and a second muffler section,
wherein the intake passage includes a dual system having a first intake passage section for guiding the air from the first intake opening provided in the first lateral side of the engine cover to the throttle body, and a second intake passage section for guiding the air from the second intake opening provided in the second lateral side of the engine cover to the throttle body, and
wherein the first muffler section is disposed partway along the first intake passage section, and the second muffler section is disposed partway along the second intake passage section.

2. The outboard motor of claim 1, wherein the muffler has a drain port formed in a bottom thereof that allows water, which has infiltrated inside the muffler, to be drained out of the muffler.

3. The outboard motor of claim 1, wherein the intake passage is provided with a silencer for reducing air intake noise, the silencer being disposed downstream of the muffler and upstream of the throttle body.

4. The outboard motor of claim 1, further comprising:
a tubular air intake guide section disposed partway along the intake passage and guiding in a vertical direction air that has been drawn in from the intake openings;
a vertical duct disposed downstream of the tubular air intake guide section near a rear wall of the engine cover so as to be bisected in a vertical direction for guiding laterally the air that has been guided vertically by the tubular air intake guide section; and
first and second vertical separation ribs disposed on the engine cover for impeding a flow of air that has been guided laterally by the vertical duct.

5. The outboard motor of claim 4, wherein the vertical duct has an interior bisected in the vertical direction and comprises a first duct section and a second duct section,
the intake passage includes a dual system having a first intake passage section for guiding the air from the first intake opening provided in the first lateral side of the engine cover to the throttle body via the first duct section, and a second intake passage section for guiding the air from the second intake opening provided in the second lateral side of the engine cover to the throttle body via the second duct section, and
the first vertical separation rib is disposed on the engine cover in a region thereof opposing the first duct section, and the second vertical separation rib is disposed on the engine cover in a region thereof opposing the second duct section.

6. The outboard motor of claim 4, wherein the vertical duct has a drain port disposed in a bottom section thereof.

7. The outboard motor of claim 4, wherein the vertical duct has first and second guide ribs disposed such that air directed into the vertical duct is guided by the first and second guide ribs towards the first and second vertical separation ribs.

8. The outboard motor of claim 1, further comprising: a silencer having a silencer chamber, the silencer being disposed upstream of the throttle body in the intake passage;
the silencer including:
a body section forming a lower half section of the silencer chamber, the body section being disposed on a belt cover that covers from above a drive belt for driving auxiliary machinery of the engine; and
a cover section forming an upper half section of the silencer chamber, the cover section being disposed on the engine cover and being detachably disposed on the body section.

9. The outboard motor of claim 8, wherein the silencer includes a sealing material between the body section and the cover section.

10. The outboard motor of claim 1, wherein the intake passage includes:
a tubular air intake guide section disposed to face in a vertical direction in a region in which air drawn in through the first and second intake openings flows in a substantially horizontal direction, the tubular air intake guide section being capable of separating water from air drawn in through the first and second intake openings;
a guide bottom section formed to extend between each of the first and second intake openings and the tubular air intake guide section, the guide bottom section being sloped downward from the tubular air intake guide section towards the first and second intake openings; and
a drain groove disposed in the guide bottom section, said drain groove guiding water, which has been separated by the tubular air intake guide section, from the tubular air intake guide section towards the first and second intake openings, the water guided into the first and second intake openings by the drain groove draining out from the engine cover through the first and second intake openings,
wherein the drain groove has an outer groove wall disposed closer towards the intake openings, and an inner groove wall disposed further away from the intake openings, a height of the outer groove wall being greater than a height of the inner groove wall.

11. The outboard motor of claim 10, wherein the drain groove is formed to have a downward pitch towards the intake openings from the intake guide section.

* * * * *